US012420395B2

(12) United States Patent
Yang et al.

(10) Patent No.: US 12,420,395 B2
(45) Date of Patent: Sep. 23, 2025

(54) NAIL PASSAGE AND DRIVING MECHANISMS AND NAIL GUN HAVING SAME

(71) Applicant: TAIZHOU DAJIANG IND. CO. LTD., Wenling (CN)

(72) Inventors: Tao Yang, Wenling (CN); Mingjun Yang, Wenling (CN); Zaijun Zhu, Wenling (CN)

(73) Assignee: TAIZHOU DAJIANG IND. CO. LTD., Wenling (CN)

( * ) Notice: Subject to any disclaimer, the term of this patent is extended or adjusted under 35 U.S.C. 154(b) by 0 days.

(21) Appl. No.: 18/234,110

(22) Filed: Aug. 15, 2023

(65) Prior Publication Data

US 2024/0051106 A1 Feb. 15, 2024

(30) Foreign Application Priority Data

Aug. 15, 2022 (CN) ........................ 202210977316.0
Aug. 15, 2022 (CN) ........................ 202222159493.6
Mar. 24, 2023 (CN) ........................ 202310320868.9
Mar. 24, 2023 (CN) ........................ 202320686686.9
May 12, 2023 (CN) ........................ 202310548290.2
May 12, 2023 (CN) ........................ 202321166205.8

(51) Int. Cl.
*B25C 5/16* (2006.01)
*B25C 1/00* (2006.01)

(52) U.S. Cl.
CPC ............ *B25C 5/1637* (2013.01); *B25C 1/005* (2013.01); *B25C 5/1627* (2013.01)

(58) Field of Classification Search
CPC ..... B25C 5/1637; B25C 1/005; B25C 5/1627; B25C 1/047; B25C 1/06
See application file for complete search history.

(56) References Cited

U.S. PATENT DOCUMENTS 3,834,602 A * 9/1974 Obergfell .................. B25C 5/06 227/138
5,632,431 A * 5/1997 Lin ....................... B25C 5/1658 227/119
5,873,509 A * 2/1999 Liao ...................... B25C 5/1658 227/119
6,851,594 B1 * 2/2005 Huang .................. B25C 5/1658 227/120
8,052,021 B2 * 11/2011 Wu ......................... B25C 1/005 227/119
10,821,586 B2 * 11/2020 Wu ......................... B25C 1/047
10,926,385 B2 * 2/2021 Myers ..................... B25C 1/008
11,130,221 B2 * 9/2021 Mikat-Stevens ........ B25C 1/041

(Continued)

*Primary Examiner* — Gloria R Weeks
*Assistant Examiner* — Katie L Gerth
(74) *Attorney, Agent, or Firm* — troutman pepper locke; Tim Tingkang Xia, Esq.

(57) ABSTRACT

The invention relates to a nail passage mechanism used for a nail gun. The nail passage mechanism comprises a muzzle member having a nail hole, a muzzle cover disposed above the muzzle member, a nail passing channel formed between the muzzle member and the muzzle cover permitting a striking member to pass therethrough for striking a nail. The muzzle cover comprises a clearance groove permitting more than one tooth blocks located on the striking member to pass therethrough, and the clearance groove locates on a first side of the nail passing channel.

13 Claims, 23 Drawing Sheets

(56) References Cited

U.S. PATENT DOCUMENTS

| | | | | |
|---|---|---|---|---|
| 11,654,540 | B2 * | 5/2023 | Garces | B25C 1/06<br>227/130 |
| 2003/0146262 | A1 * | 8/2003 | Hwang | B25C 1/005<br>227/113 |
| 2011/0198381 | A1 * | 8/2011 | McCardle | B25C 1/06<br>227/8 |
| 2018/0036870 | A1 * | 2/2018 | Komazaki | B25C 1/06 |
| 2019/0126453 | A1 * | 5/2019 | Po | B25C 1/047 |
| 2021/0060749 | A1 * | 3/2021 | Yang | B25C 1/008 |
| 2021/0316433 | A1 * | 10/2021 | Ueda | B25C 1/047 |
| 2021/0379747 | A1 * | 12/2021 | Mikat-Stevens | B25C 1/041 |

* cited by examiner

NAIL PASSAGE AND DRIVING MECHANISMS AND NAIL GUN HAVING SAME

CROSS-REFERENCE TO RELATED PATENT APPLICATIONS

This application claims priority to and benefit of Chinese Patent Application No. 202222159493.6 filed on Aug. 15, 2022, Chinese Patent Application No. 202210977316.0 filed on Aug. 15, 2022, Chinese Patent Application No. 202310320868.9 filed on Mar. 24, 2023, Chinese Patent Application No. 202320686686.9 filed on Mar. 24, 2023, Chinese Patent Application No. 202310548290.2 filed on May 12, 2023, and Chinese Patent Application No. 202321166205.8 filed on May 12, 2023, which are hereby incorporated by reference in their entireties.

FIELD OF THE INVENTION

This invention relates generally to fastening tools technology, and more particularly to a nail passage mechanism and a driving mechanism for a nail gun.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Nail gun is a fastening tool, commonly used in construction. Currently, a widely used type of nail gun is the electric nail gun powered by a battery, i.e., lithium-ion battery. The nail gun operates by driving a motor and the corresponding transmission structure to push the piston. The piston then compresses a power spring or gas to store energy. When striking a nail, the power spring or air pressure drives the piston, which then propels the striking member, i.e., a pin mounted on the piston to strike and shoot out the nail, achieving nailing.

In existing nail guns, the transmission structure that drives the piston usually employs a driving teeth rack and gear mechanism. That is, a driving teeth rack is disposed on the striking member, and a gear is connected to the drive motor. The drive motor rotates the gear, and as the driving teeth rack and gear engage, the rotation of the gear causes the driving teeth rack to move laterally, compressing the power spring or gas to store energy. When the gear rotates to a position where it no longer engages with the driving teeth rack on the striking member, the power spring or air pressure pushes the striking member out, which then strike out the nail, realizing the nailing process.

The head of the nail gun is equipped with a magazine mechanism for storing nails. The nails are fed out by the magazine mechanism and are parallel to the striking member. Existing nail guns have a nail slot at the gun head. Nails are struck and ejected along this slot, and when the striking member strikes the nail, its front end also passes through this nail slot. Since the striking member has a driving teeth rack set on its side for driving, the nail slot is typically designed to be relatively wide to allow the striking member to pass through. However, precisely because the nail slot of existing nail guns is set too wide, if the nail experiences uneven force when struck by the striking member, it can easily deviate during activation, causing it to get stuck in the nail slot and fail to pass through properly.

In addition, the aforementioned transmission structure includes a drive mechanism, which comprises a drive wheel and a strike member which meshes with this drive wheel. The drive wheel is equipped with pinions, and the striking member is designed with a teeth structure that engages with the pinions. The drive motor drives the rotation of the drive wheel, which then causes the striking member to rise and store energy. When the drive wheel rotates past the position of the last pinion, the striking member is released to strike a nail. At this moment of release, the teeth structure causes wear on the last pinion. After prolonged use (as per experimental tests, after 10,000 strikes), this last pinion can easily break, posing a safety risk. Moreover, this wear reduces the service life of the nail gun.

Therefore, a heretofore unaddressed needs exist in the art to address the aforementioned deficiencies and inadequacies.

SUMMARY OF THE INVENTION

In one aspect, this invention relates to a nail passage mechanism used for a nail gun. The nail passage mechanism comprises a muzzle member having a nail hole; a muzzle cover disposed above the muzzle member; and a nail passing channel formed between the muzzle member and the muzzle cover permitting a striking member to pass therethrough for striking a nail, wherein the muzzle cover comprises a clearance groove permitting more than one tooth blocks located on the striking member to pass therethrough; wherein the clearance groove locates on a first side of the nail passing channel.

In one embodiment, the muzzle member comprises a protruding blocking rim protruding from a surface of the nail-passing channel; and wherein the protruding blocking rim locates on the first side of the nail passing channel preventing the deviation of the nail when the nail passes through the nail passing channel.

In one embodiment, a magazine mechanism is connected to the muzzle member; and wherein the magazine mechanism feeds the nail into the nail passage mechanism.

In one embodiment, the muzzle cover comprises a guiding bar received by a primary guiding groove located on the striking member.

In one embodiment, the muzzle member comprises a magnet installation hole adjacent to the nail hole; wherein the magnet installation hole is configured to receive a magnet.

In one embodiment, the muzzle member and the muzzle cover are connected via a fastener.

In another aspect of the invention, the invention relates to a nail gun for nailing. The nail gun comprises a nail storage mechanism having a magazine mechanism for storing a nail; a driving mechanism; a striking mechanism in association with the driving mechanism; and a nail passage mechanism, wherein the magazine mechanism and the striking mechanism are both in association with the nail passage mechanism; and wherein the striking mechanism comprises a striking member and strikes a nail in a striking direction.

In one embodiment, the striking member comprising a striking member body having a guiding groove, and more than one tooth blocks sequentially arranged on one side of the striking member body and protruding from the side of the striking member body; and wherein at least one tooth groove is formed between the two adjacent tooth blocks.

In one embodiment, the striking member comprises a secondary guiding groove.

In one embodiment, the secondary guiding groove locates at a junction between the tooth blocks and the striking member body.

In one embodiment, the nail gun further comprises an energy storage mechanism in association with the striking mechanism for providing power to the striking member.

In one embodiment, the driving mechanism comprises a transmission component in association with the striking mechanism; and a motor driving rotation of the transmission component.

In one embodiment, the transmission component drives the striking mechanism to move in a direction opposite to the striking direction.

In one embodiment, the transmission component comprises a rotating part; more than one pinions connected to the rotating part; and a limiting disk disposed on the rotating part.

In one embodiment, the driving mechanism comprises a limiting component in association with the transmission component; and wherein the limiting component is configured to stop the rotation of the transmission component.

In another aspect of the invention, the invention relates to a driving mechanism used for a nail gun. The driving mechanism includes a driving wheel. The drive wheel comprises a rotating part driven by a motor for rotation; and a plurality of pinions connected to the rotation part for meshing with a striking member; wherein the plurality of pinions comprises a releasable pinion slidably received in a first movable hole located on the rotating part; and wherein the releasable pinion and the rotating part is connected by a first spring member.

In one embodiment, the rotating part comprises a first spring chamber housing the first spring member; wherein the first spring member comprises a first spring connected to a first top block; wherein the first top block is in contact with the releasable pinion.

In one embodiment, the plurality of pinions comprises a first pinion slidably received in a second movable hole located on the rotating part; and wherein the first pinion and the rotating part is connected by a second spring member.

In one embodiment, the rotating part comprises a second spring chamber housing the second spring member; wherein the second spring member comprises a second spring connected to a second top block; and wherein the second top block is in contact with the first pinion.

In one embodiment, the rotating part comprises a clearance notch located between the releasable pinion and the first pinion.

These and other aspects of the invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
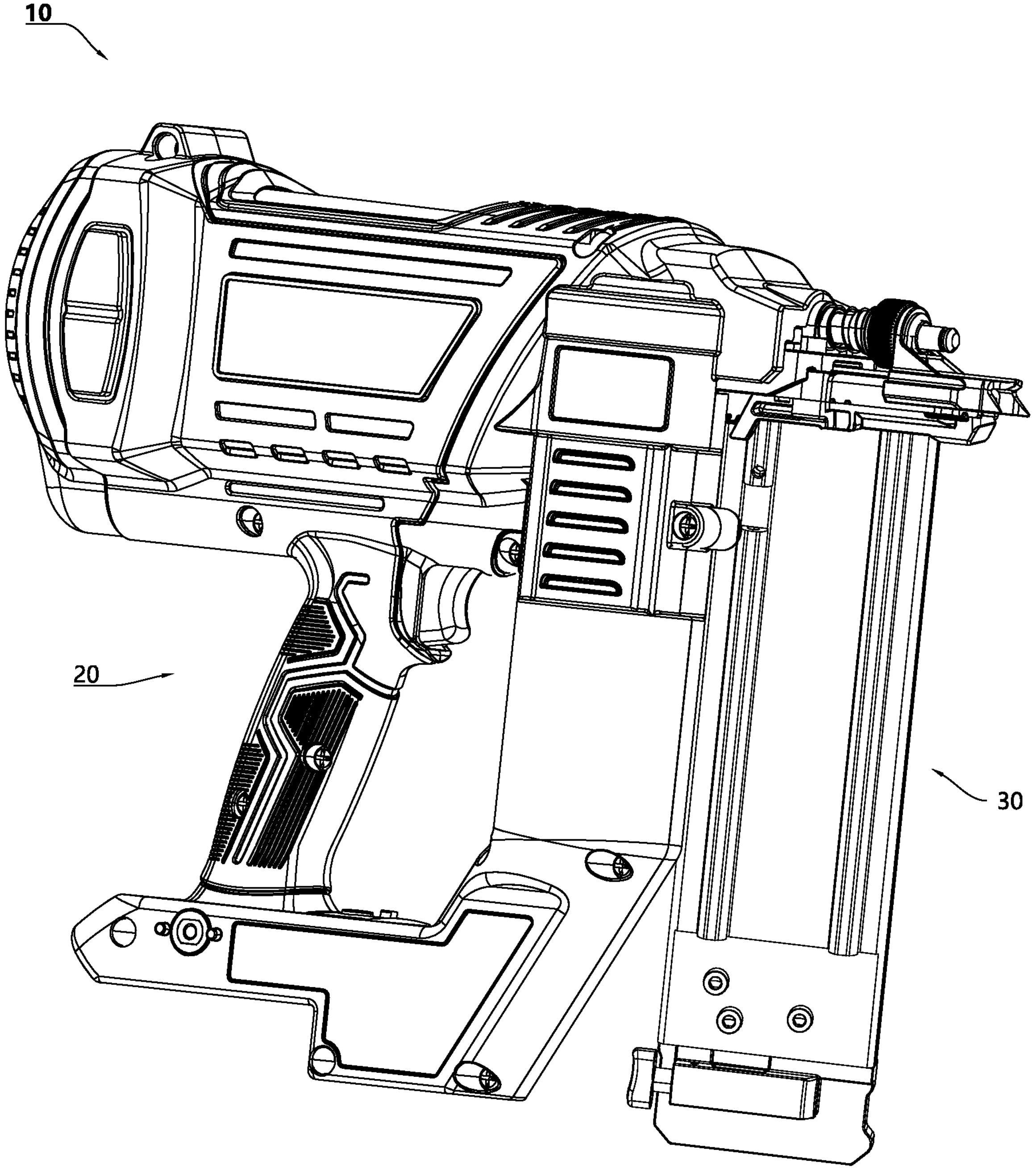
FIG. 1 is a schematic structural view of a nail gun according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed may be resorted to by those skilled in the art, and that such modifications and variations are considered to be within the scope of this invention as defined by the appended claims.

Whenever a range is given in the specification, for example, a temperature range, a time range, or a composition or concentration range, all intermediate ranges and subranges, as well as all individual values included in the ranges given are intended to be included in the invention. It will be understood that any subranges or individual values in a range or subrange that are included in the description herein can be excluded from the claims herein.

It will be understood that, as used in the description herein and throughout the claims that follow, the meaning of "a", "an", and "the" includes plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper,"

depending of the particular orientation of the figure. Similarly, if the device in one of the figures is turned over, elements described as “below” or “beneath” other elements would then be oriented “above” the other elements. The exemplary terms “below” or “beneath” can, therefore, encompass both an orientation of above and below.

It will be further understood that the terms “comprises” and/or “comprising”, or “includes” and/or “including”, or “has” and/or “having”, or “carry” and/or “carrying”, or “contain” and/or “containing”, or “involve” and/or “involving”, “characterized by”, and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used in the disclosure, “around”, “about”, “approximately” or “substantially” shall generally mean within 20 percent, preferably within 10 percent, and more preferably within 5 percent of a given value or range. Numerical quantities given herein are approximate, meaning that the term “around”, “about”, “approximately” or “substantially” can be inferred if not expressly stated.

As used in the disclosure, the phrase “at least one of A, B, and C” should be construed to mean a logical (A or B or C), using a non-exclusive logical OR. As used herein, the term “and/or” includes any and all combinations of one or more of the associated listed items.

As used in the disclosure, “energy storage” refers to a function of a device for storing the energy within the device. The energy may be in form of pressure, heat, or other forms.

As used in the disclosure, “air chamber” refers to an internal chamber, cavity, or compartment within a device into which a volume of fluid is enclosed. The fluid may be air, gas, nitrogen or other form of fluid proper for providing pressure in the chamber. The air chamber has one or more port for receiving and/or releasing fluid. The air chamber may be air-tight when all the ports are closed.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

In accordance with the purposes of this invention, as embodied and broadly described herein, this invention, in certain aspects, relates to nail passage mechanism for lithium-ion battery nail gun. Embodiments of the invention are now described in conjunction with the accompanying drawings in FIGS. 1-34.

Embodiment 1

To solve the aforementioned problems, this invention provides a nail passage mechanism preventing nails from deviating and getting stuck within the nail slot, and a nail gun equipped having the nail passage mechanism. The technical solution adopted by this invention is as follows.

The invention provides a nail passage mechanism on a nail gun. This nail passage mechanism is used in conjunction with the striking structure inside the nail gun’s driving mechanism and the magazine mechanism of the nail storage device to shoot out the nail. It possesses the following technical features. The nail gun has a muzzle mechanism having a muzzle member for mounting the main body of the magazine mechanism and has a nail hole for directing nails out of the main body of the magazine. A muzzle cover is placed over the muzzle member. Between the muzzle member and the muzzle cover, there’s a nail passage channel for the movement of the striking member and for the nail to passage. The muzzle cover has a clearance slot to accommodate the tooth block of the striking member structure. On one side of the nail hole, the muzzle mechanism has a protruding edge to prevent nails from deviating into the clearance slot.

Additionally, in one embodiment, this nail passage mechanism can have features where the cover, on one side of the clearance slot, has a guide bar to match the main guiding slot of the striking member structure.

Furthermore, in one embodiment, the muzzle mechanism has a magnet installation hole on the front end of the nail hole for fitting a magnet.

In one embodiment, the muzzle member and the muzzle cover can be fastened together using screws.

In one embodiment, the invention also proposes a nail gun with the following features: a nail storage device with a magazine mechanism for storing nails, and a driving mechanism with a striking mechanism for propelling the nails in the firing direction. The magazine mechanism and striking mechanism are assembled together through the aforementioned nail passage mechanism.

In one embodiment, this nail gun also has features where the striking mechanism, which is used to strike the nails in the striking direction, having of a striking member structure. This striking member structure comprises: a main body with a main guiding slot, and a tooth block with several teeth arranged sequentially on one side of the main body. The gaps between adjacent teeth form notches, and the tooth block connects to the main body to form a secondary guiding slot which matches the protruding edge.

Moreover, in one embodiment, the driving mechanism includes an energy storage structure to provide power for the forward movement of the striking structure in the striking direction, and a driving mechanism connected to the nail gun’s motor. This driving mechanism aligns with the striking structure to provide power for its backward movement in the striking direction. The driving mechanism has a transmission component for moving the striking member structure backward in the striking direction, and a limit component to restrict the movement of the striking member structure. The transmission component has a limit section to engage with the limit component.

In one embodiment, the transmission component of this nail gun has a rotating section driven by the motor, and a matching section on the rotating section to engage with the striking pin structure, causing it to move linearly in the striking direction. It also has several pinions to fit into the notches.

In another embodiment, at least one of the pinions can be movable. The rotating section has a movement hole for this movable pinion. There's a spring between the movable pinion and the rotating section. One end of this spring acts on the rotating section, and the other end acts on the movable pinion. The rotating section has a cavity for installing the spring.

In one embodiment, the limit component can be a ratchet disposed co-axially with the rotating section. This ratchet has several teeth on its outer circumference. The limit component is a ratchet claw that matches and engages between the adjacent teeth of the ratchet.

In one embodiment, when the nail is fed by the magazine mechanism, it is precisely positioned above the nail hole. Since there is a protruding edge on the muzzle mechanism on one side of the nail hole that sticks out from the surface of the nail passage channel, it acts as a barrier to the side of the nail. This ensures that when the nail is struck, it can only be dispatched in the striking direction and will not deviate sideways. This guarantees the accuracy of the nail's striking and also prevents the nail from deviating and getting stuck in the nail passage channel due to uneven force.

FIG. 1 shows a schematic structural view of a nail gun in one embodiment of the invention.

Figure 2:
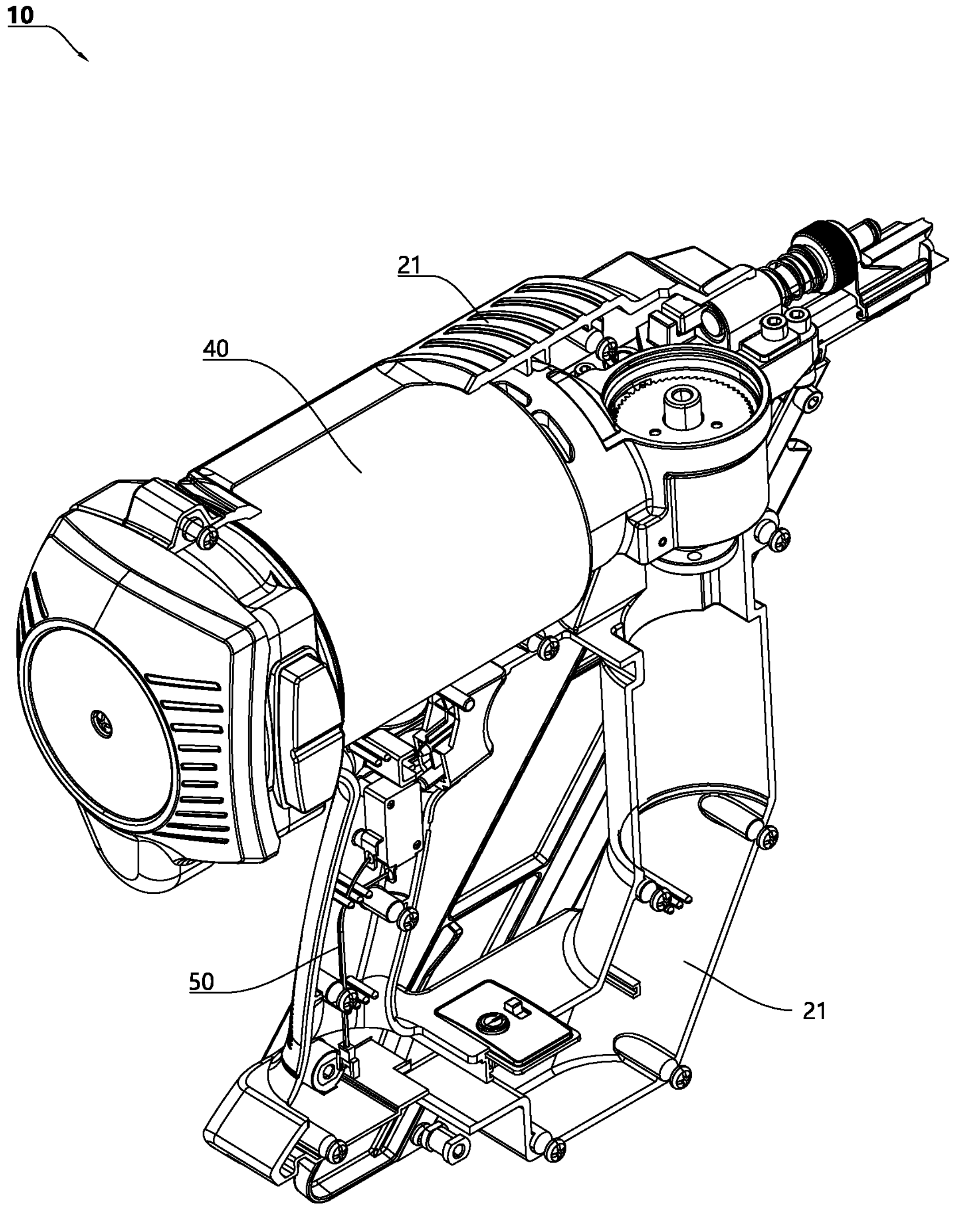
FIG. 2 is a schematic structural view of a nail gun with partial casing removed according to one embodiment of the invention.

FIG. 2 shows a schematic structural view of the nail gun with partial shell removed in one embodiment of the invention.

The nail gun 10 according to one embodiment of the invention includes a containment mechanism 20, a nail storage mechanism 30, a driving mechanism 40 for driving the nail out, and a control mechanism 50 for controlling the driving member. As shown in FIGS. 1 and 2, the containment mechanism 20 includes a casing 21 set on the outside, the nail storage mechanism 30 is disposed at the front end of the casing 21, and nails are stored inside the nail storage mechanism 30. The control mechanism 50 includes parts such as a power source (lithium battery), control board, circuit, switch, etc. (not fully shown in the figures), all installed inside and on the surface of the casing 21. The casing 21 not only contain internal parts such as the driving mechanism 40 and the control mechanism 50, but also protect these internal parts.

Figure 3:
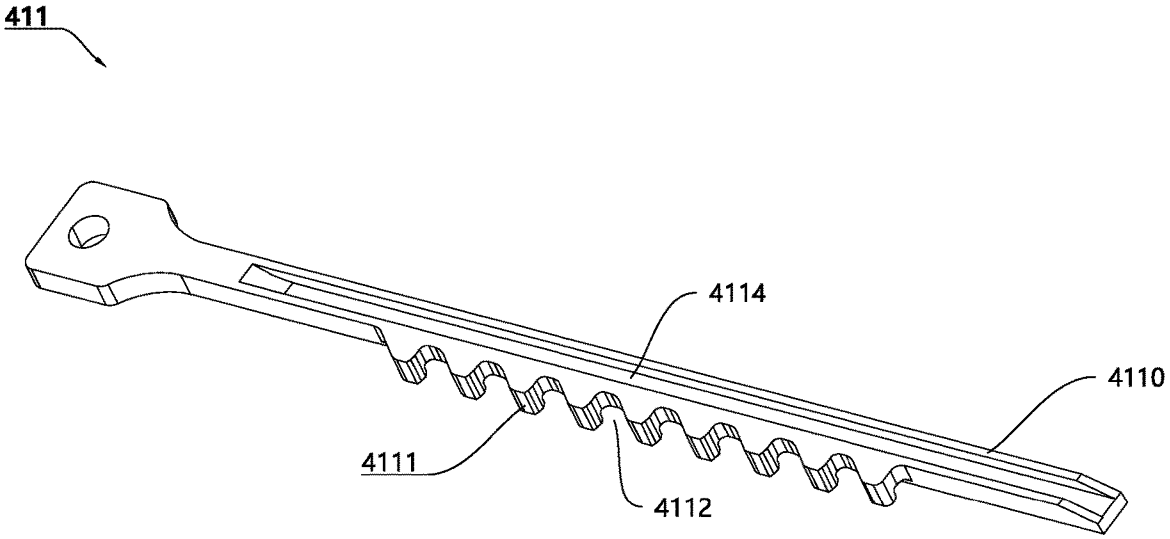
FIG. 3 is a schematic structural view of a striking member of the nail gun according to one embodiment of the invention.

FIG. 3 is a schematic structural view of a striking member of the nail gun according to one embodiment of the invention.

Figure 4:
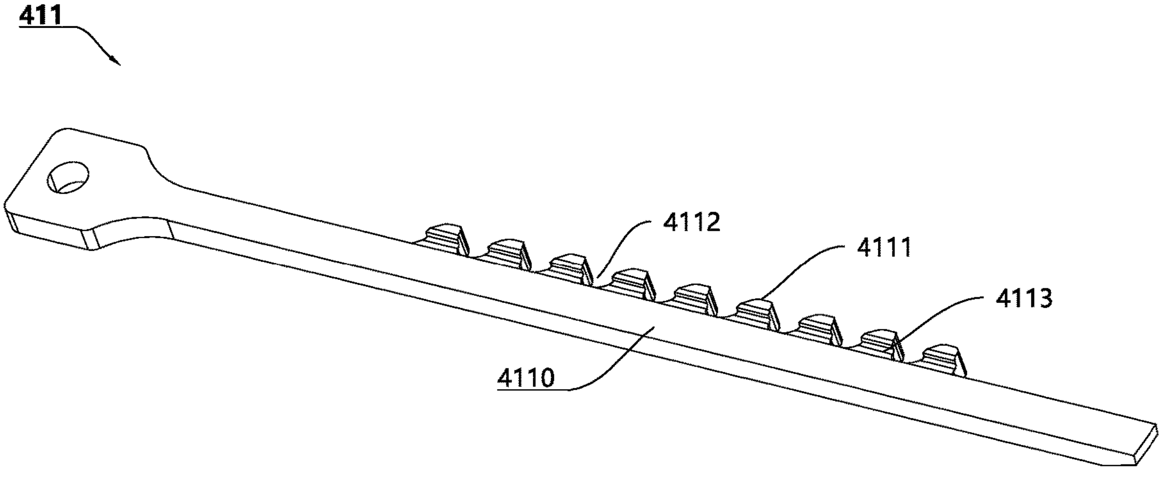
FIG. 4 is another schematic structural view of a striking member of the nail gun according to one embodiment of the invention.

FIG. 4 is another schematic structural view of a striking member of the nail gun according to one embodiment of the invention.

As shown in FIGS. 2-4, the driving mechanism 40 is disposed inside the housing 21 and functions to strike the nail out. The driving mechanism 40 includes a striking mechanism 41 that comes into direct contact with the nail to eject it. The striking mechanism 41 comprises a striking member 411 and a piston member 412. The inner end of the striking member 411 is inserted into the piston member 412, and its outer end extends into the nail passage mechanism 32. As shown in FIG. 3, the striking member 411 in one embodiment includes a striking member body 4110. One side of the striking member body 4110 is equipped with several toothed blocks 4111. The striking member 411 has a primary guiding groove 4114 in the central part of the striking member body 4110. In one embodiment, on the other side of the striking member body 4110, there is a secondary guiding groove 4113. In one embodiment, the secondary guiding groove 4113 locates on the toothed blocks 4111, as shown in FIG. 4.

Figure 5:
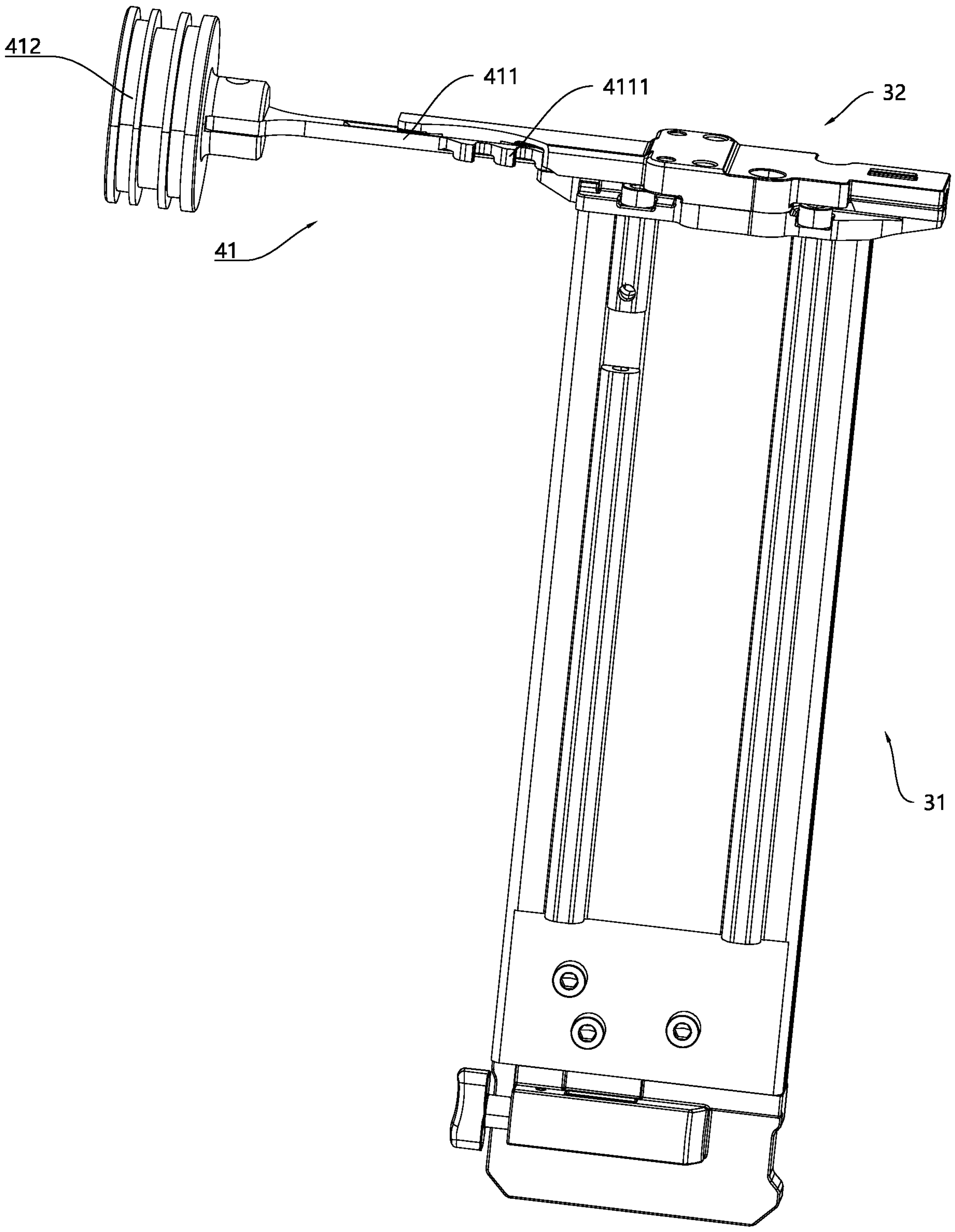
FIG. 5 is schematic structural view of a striking mechanism in association with a magazine mechanism according to one embodiment of the invention.

FIG. 5 is schematic structural view of a striking mechanism in association with a magazine mechanism according to one embodiment of the invention.

Figure 6:
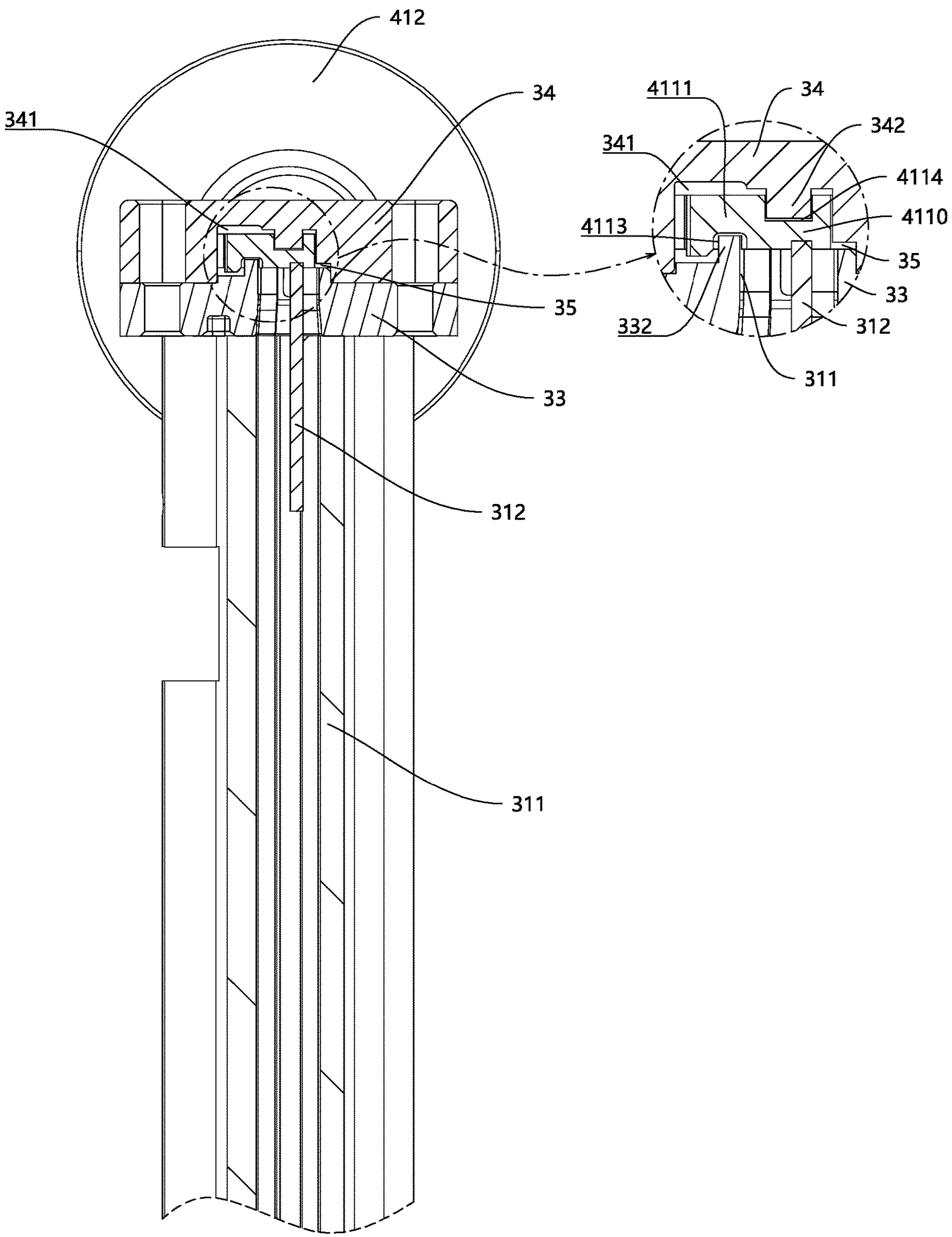
FIG. 6 is a cross-sectional view of the striking mechanism in association with the magazine mechanism according to one embodiment of the invention.

FIG. 6 displays the cross-sectional view of the striking mechanism and the magazine mechanism in one embodiment of this invention.

As shown in FIGS. 5 and 6, the striking mechanism 41 and the magazine mechanism 31 are assembled together via the nail passage mechanism 32. In one embodiment, straight steel nails are chosen. The magazine mechanism 31 has a magazine mechanism 311 for storing nails. Inside the magazine mechanism 311, a nail push block 312 designed to push the nails out. Several nails are aligned inside the magazine mechanism 311, with the nail push block 312 positioned below the nails. Specifically, a spring is disposed between the base of the nail push block 312 and the interior bottom of the magazine mechanism 311. The resilience of the spring allows the nail push block 312 to act on the nails, sequentially pushing them upwards.

Figure 7:
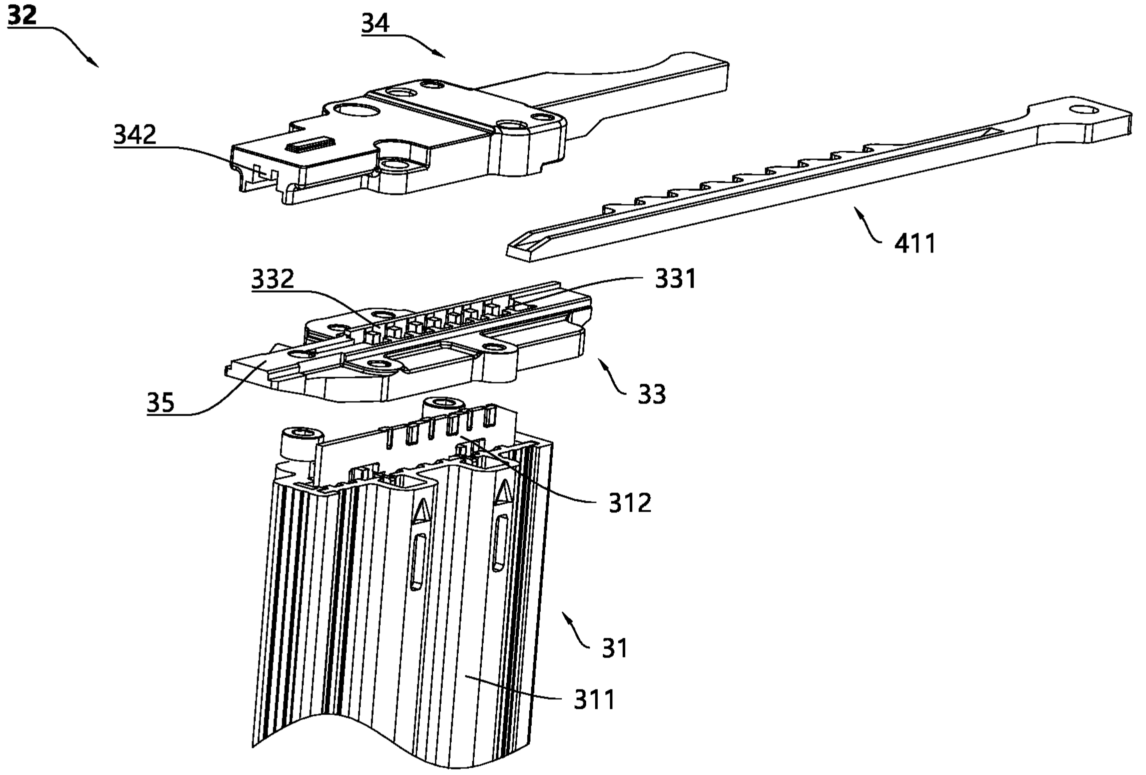
FIG. 7 is an exploded view of the striking mechanism in association with the magazine mechanism according to one embodiment of the invention.

FIG. 7 presents the exploded view of the installation structure of the striking mechanism in association with the magazine mechanism in one embodiment.

Figure 8:
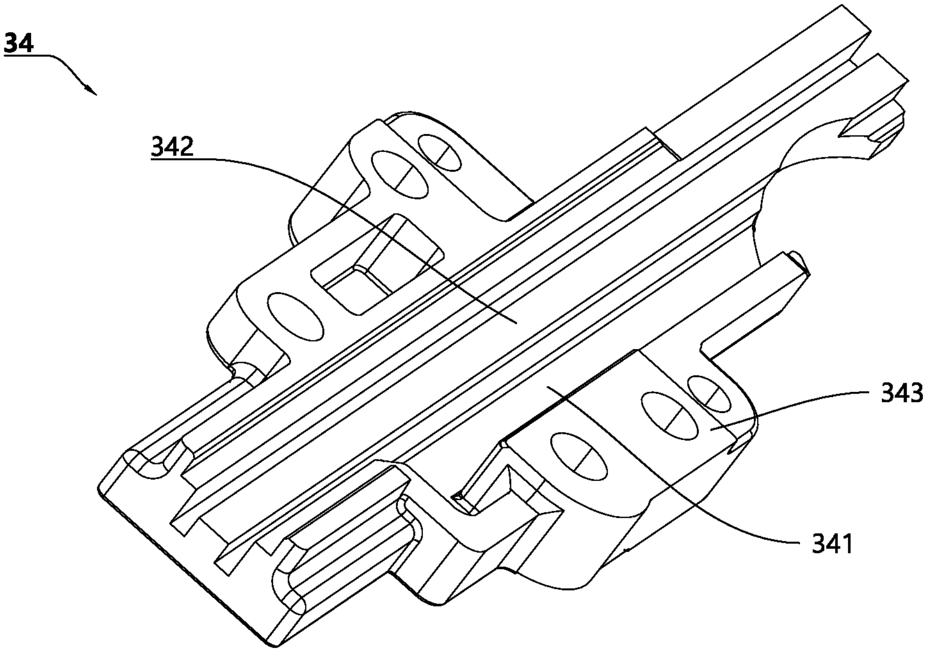
FIG. 8 is a schematic structural view of a muzzle cover according to one embodiment of the invention.

FIG. 8 shows the schematic diagram of the structure of the muzzle cover in one embodiment.

The nail passage mechanism 32 consists of a muzzle member 33 and a muzzle cover 34. The magazine mechanism 311 is mounted below the muzzle member 33. A nail hole 331 in the muzzle member 33 leads to the magazine mechanism 311, allowing nails from inside the magazine mechanism 311 to be ejected. The nail push block 312 pushes the nail up to the nail hole 331, waiting to be struck by the striking member 411. The muzzle cover 34 is positioned above the muzzle member 33, and a nail passing channel 35 is formed between the muzzle cover 34 and the muzzle member 33. The front end of the striking member 411 is configured to move through the nail passing channel 35 and for the nail to pass through the nail passing channel 35. As shown in FIGS. 6 and 8, to ensure the smooth movement of the front end of the striking member 411 within the nail passing channel 35, The muzzle cover 34 has a clearance groove 341 to accommodate the toothed blocks 4111. The length of the clearance groove 341 corresponds to the number and length of the toothed blocks 4111 that can move within the nail passing channel 35. On one side of the clearance groove 341 of the muzzle cover 34, there is a guiding bar 342 that matches the primary guiding groove 4114 of the striking member 411. The guiding bar 342 is embedded inside the primary guiding groove 4114, directing the movement of the striking member along the guiding bar 342, preventing it from deviating during motion.

Figure 9:
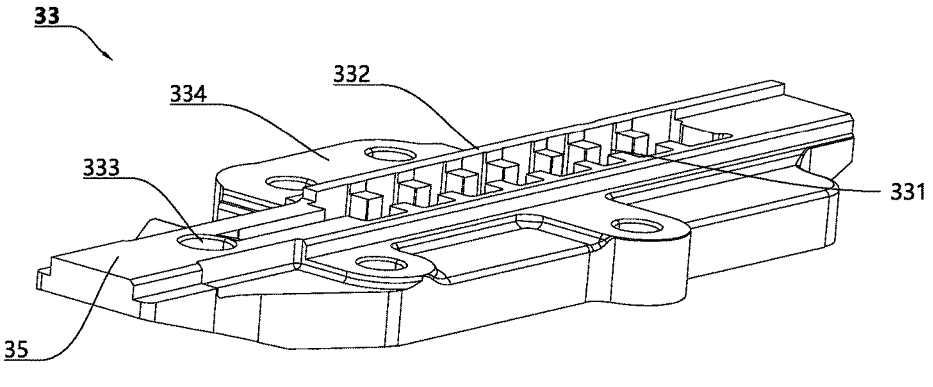
FIG. 9 is a schematic structural view of a muzzle member according to one embodiment of the invention.

FIG. 9 illustrates the schematic diagram of the muzzle member in this embodiment.

As disclosed in FIGS. 7 and 9, on one side of the nail hole 331 of the muzzle member 33, a protruding blocking rim 332 extending from the surface of the nail passing channel and the nail hole 331. The protruding blocking rim 332, located on the same side as the clearance groove 341, serves to prevent the nail from deviating. At the same time, when the striking member 411 moves along the nail passing channel 35, the protruding blocking rim 332 interacts with the secondary guiding groove 4113 of the striking member 411, e.g., the protruding blocking rim 332 is received and accommodated in the secondary guiding groove 4113 of the striking member 411 as shown in FIG. 6, and thus plays a role in guiding the movement of the striking member 411. In one embodiment, a magnet installation hole 333 for installing a magnet is disposed at the front send of the nail hole 331 of the muzzle member 33 and in the direction of the nail ejection. Installing a magnet helps to prevent nails from falling out. Specifically, when the user is not nailing but merely holding the nail gun with its muzzle pointing downwards, the nail positioned at the nail hole 331 might easily fall out. Since most nails are made of metal materials, e.g. iron, placing a magnet in the nailing direction creates an attractive force on the nail, preventing the nail from falling out, therefore enhancing safety.

As shown in FIGS. 8 and 9, the muzzle member 33 and the muzzle cover 34 have mounting bases 334 and 343 respectively. The mounting bases 334 and 343 locate on the two sides of the nail passing channel 35, respectively. These mounting bases feature corresponding threaded holes. The muzzle member 33 and the muzzle cover 34 are securely assembled together using screws through the corresponding threaded holes.

Figure 10:
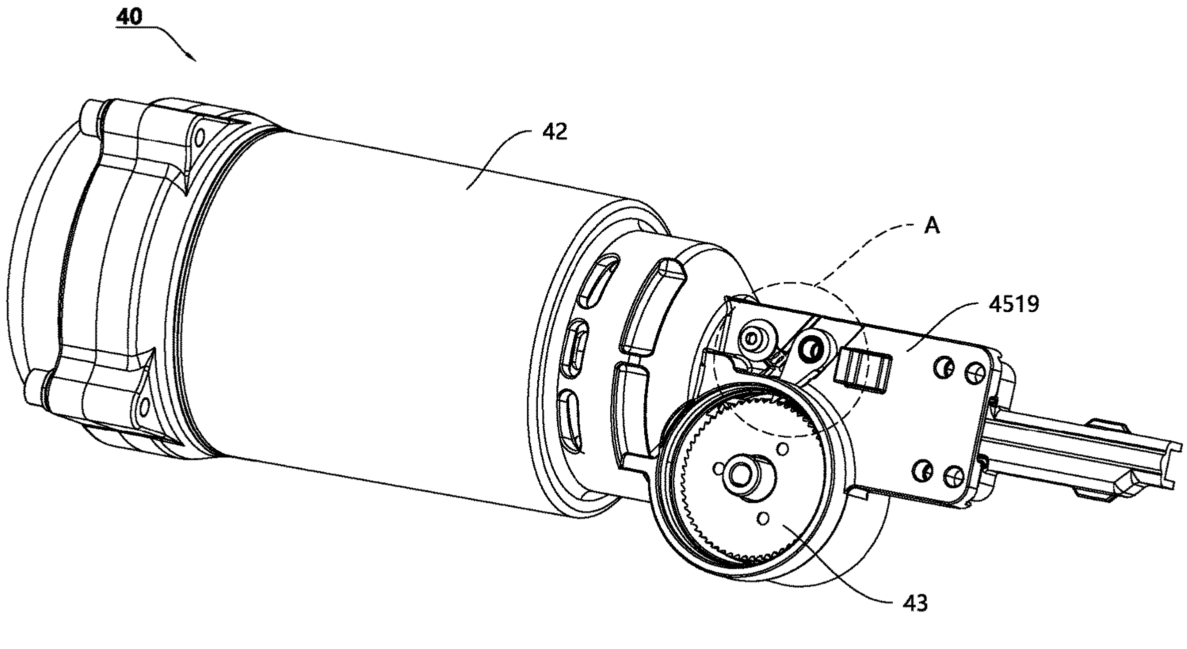
FIG. 10 is a schematic structural view of an energy storage mechanism in association with a driving mechanism according to one embodiment of the invention.

FIG. 10 is a schematic structural view of an energy storage mechanism in association with a driving mechanism according to one embodiment of the invention.

Figure 11:
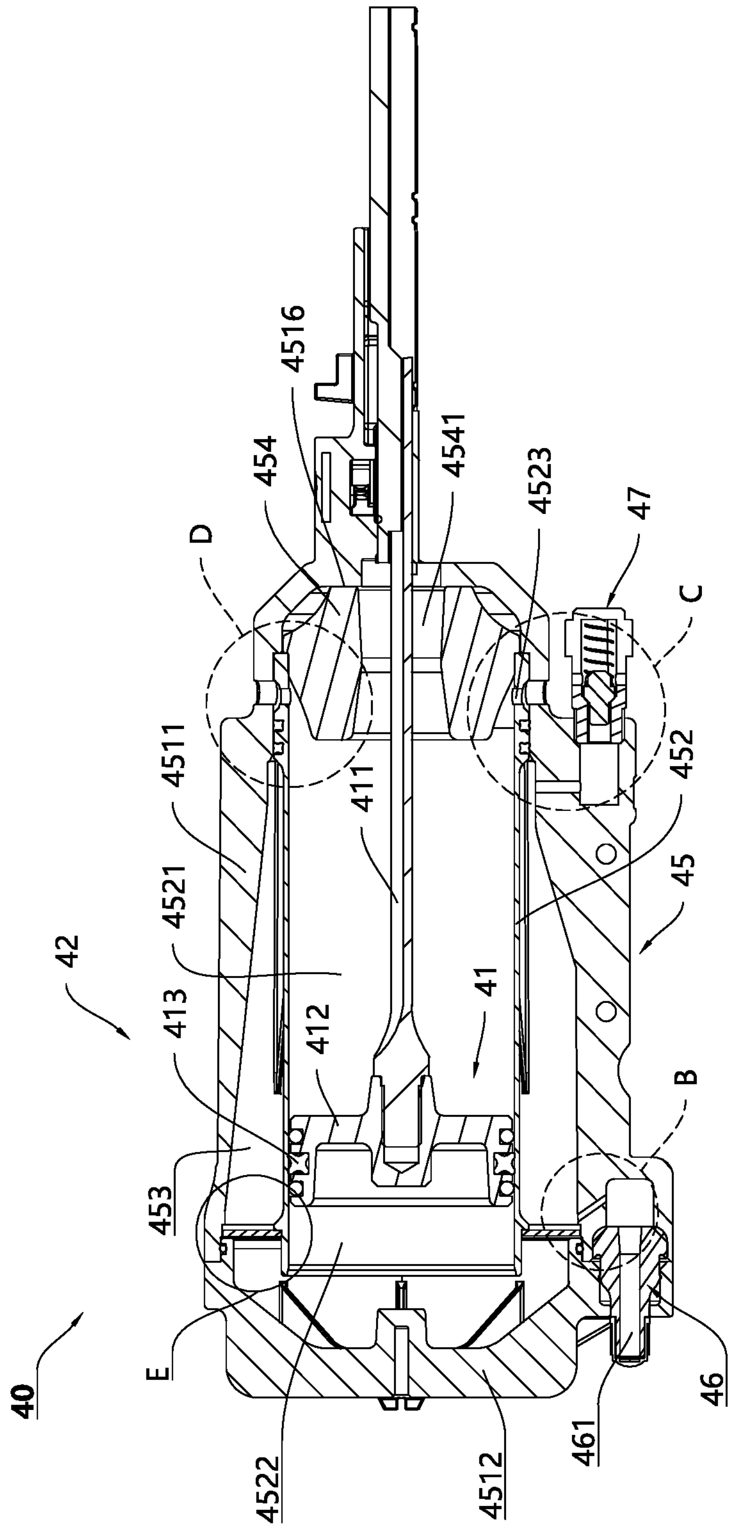
FIG. 11 is a cross-sectional view of the energy storage mechanism in association with the driving mechanism according to one embodiment of the invention.

FIG. 11 is a cross-sectional view of the energy storage mechanism in association with the driving mechanism according to one embodiment of the invention.

Figure 12:
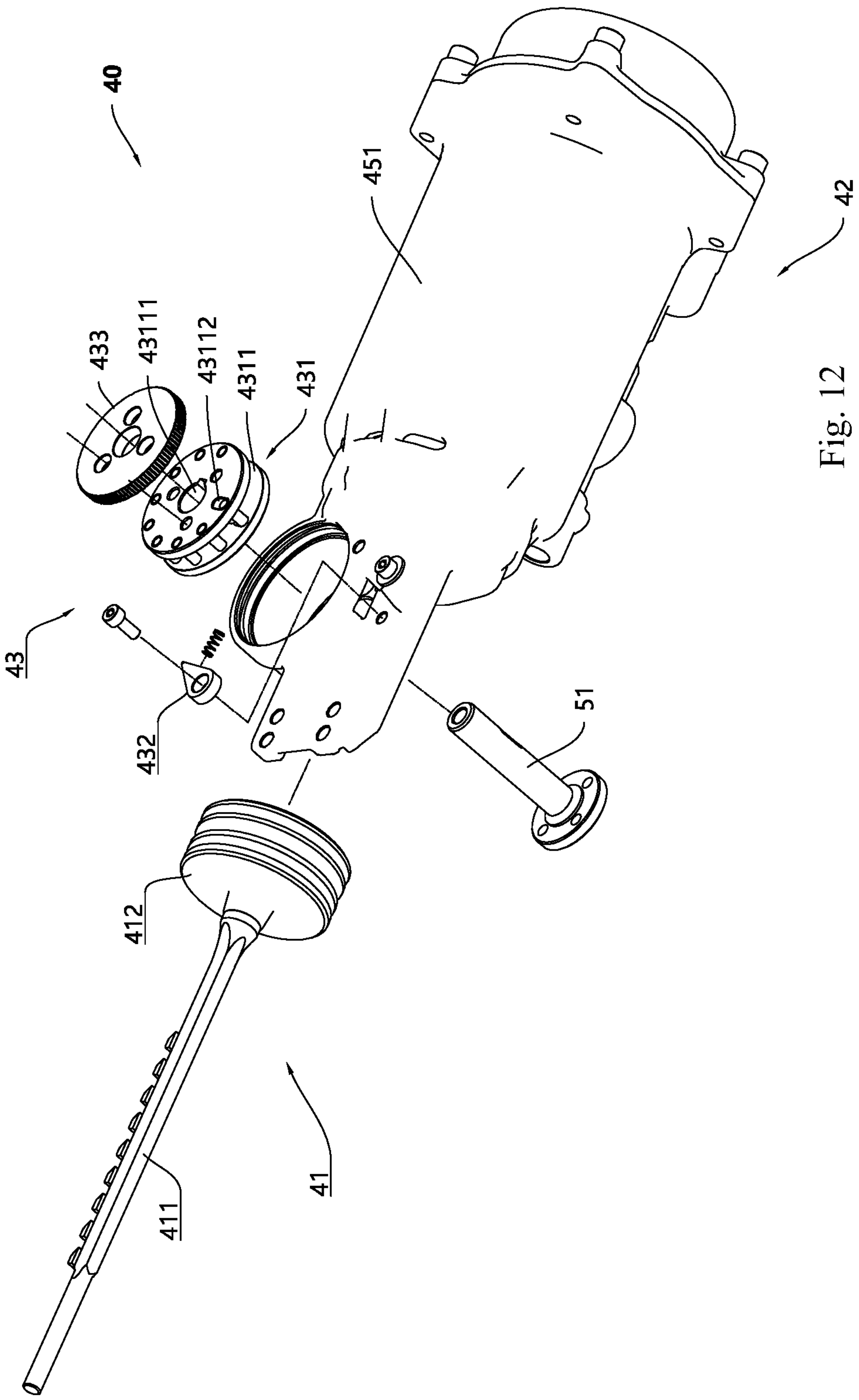
FIG. 12 is an exploded structural view of the energy storage mechanism in association with the driving mechanism according to one embodiment of the invention.

FIG. 12 is an exploded structural view of the energy storage mechanism in association with the driving mechanism according to one embodiment of the invention.

As shown in FIGS. 10-12, the driving mechanism 40 includes the striking mechanism 41, which directly contacts the nail and is used to strike the nail out. It also comprises an energy storage mechanism 42 providing power to the striking mechanism 41, and a transmission mechanism 43. The striking mechanism 41 has a striking direction which is the same direction in which the nail is driven into the nailed object. The energy storage mechanism 42 drives the striking mechanism 41 to move forward in the striking direction to drive the nail out, while the transmission mechanism 43 causes the striking mechanism 41 to move in the reverse direction of the striking direction, thereby triggering the energy storage mechanism 42 to store energy.

The striking mechanism 41 includes a striking member 411 and a piston part 412. The inner end of the striking member 411 is inserted onto the piston part 412. The piston part 412 is configured to move within the energy storage mechanism 42. The outer end of the striking member 411 extends out of the energy storage mechanism 42 and inserts into the nail passage mechanism 32 to push the nail and strike it out in the striking direction.

The transmission mechanism 43 comprises a transmission component 431 and a limiting component 432. The transmission component 431 is designed to cooperate with the striking member 411 and drive the striking member 411 to move in an direction opposite to the striking direction. The limiting component 432 works with the transmission component 431 to limit the movement of the striking member 411. A limiting disk 433, which cooperates with the position-limiting component 432, is connected to the transmission component 431.

Figure 13:
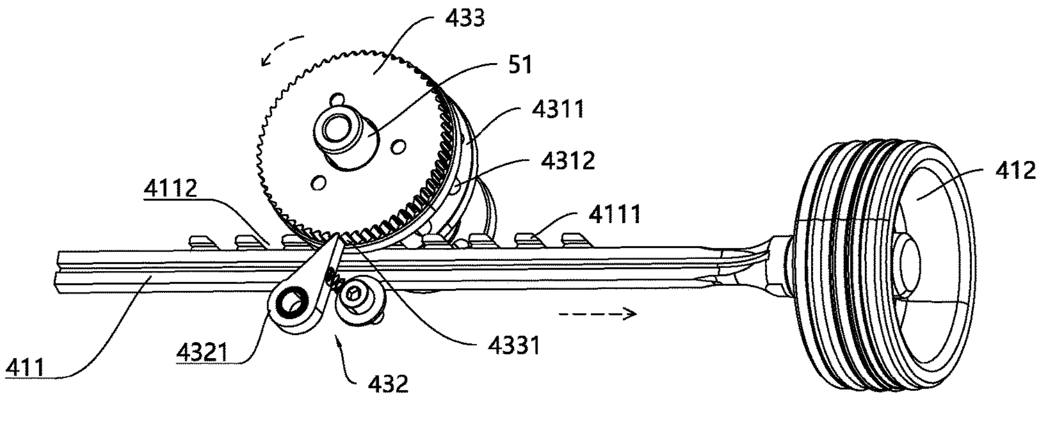
FIG. 13 is a schematic structural view of a transmission mechanism in association with a striking mechanism according to one embodiment of the invention.

FIG. 13 is a schematic structural view of a transmission mechanism in association with a striking mechanism according to one embodiment of the invention.

Figure 14:
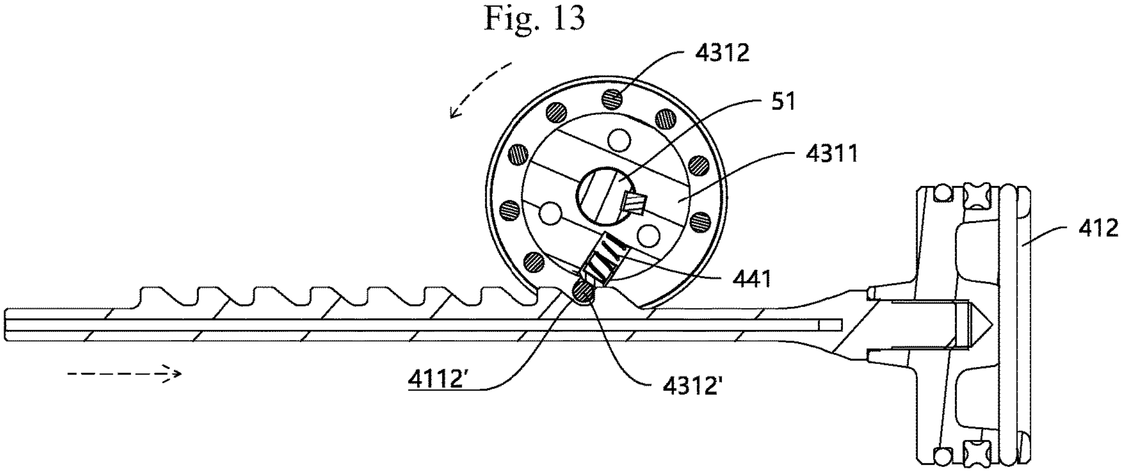
FIG. 14 is a cross-sectional views of the transmission mechanism in association with the striking mechanism according to one embodiment of the invention.

FIG. 14 is a cross-sectional views of the transmission mechanism in association with the striking mechanism according to one embodiment of the invention.

Figure 15:
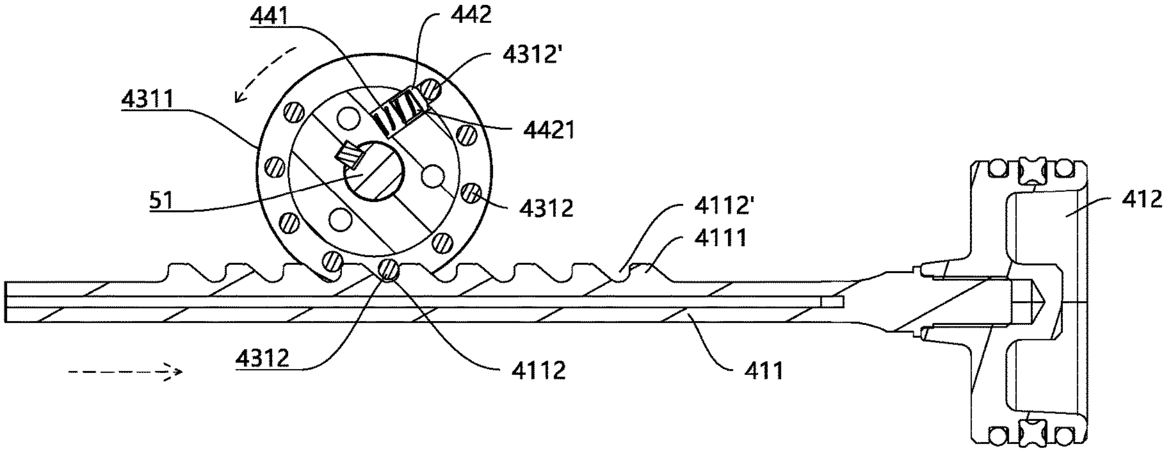
FIG. 15 is another cross-sectional view of the transmission mechanism in association with the striking mechanism according to one embodiment of the invention.

FIG. 15 is another cross-sectional view of the transmission mechanism in association with the striking mechanism according to one embodiment of the invention.

As shown in FIGS. 13 and 14, one side of the striking member 411 is equipped with several tooth blocks 4111, with tooth grooves 4112 formed between adjacent tooth blocks 4111. The transmission component 431 includes a rotating part 4311 and a matching part. The rotating part 4311 is a circular structure with a cross-section in the shape of a horizontal "H" character. A mounting hole 43111 is provided in the middle, through which the rotating part 4311 can be installed on the output shaft 51 of the nail gun's motor (not shown in the figure), allowing the rotating part 4311 to rotate under the drive of the motor. The matching part has several pinions 4312 arranged on the rotating part 4311, and, during the operation, these pinions 4312 are received by the tooth grooves 4112 of the striking member 411 (as shown in FIG. 14), allowing the transmission component 431 to coordinate with the striking member 411. When the rotating part 4311 rotates under the drive of the motor, the pinions 4312 are received in the tooth grooves 4112, thereby driving the striking member 411 to move laterally. As shown in FIG. 15, when the pinions 4312 rotate counterclockwise with the rotating part 4311, they can drive the striking member 411 to move to the right (using the dash arrow direction shown in FIG. 15 as a reference, the direction of the dash arrow is the opposite to the striking direction).

As shown in FIGS. 14 and 15, among the several pinions 4312, there is at least one movable pinion 4312'. A long oval hole 43112 is provided on the rotating part 4311 for the movable pinion 4312' to move (as shown in FIG. 11). A spring assembly is disposed between the movable pinion 4312' and the rotating part 4311. This spring assembly includes a first spring 441 with one end acts on the rotating part 4311 and the other end acts on the movable pinion 4312'. A cavity is opened in the rotating part 4311 for the installation of the first spring 441. The spring assembly also includes a top block 442 located between the first spring 441 and the movable pinion 4312'. The side of the top block 442 facing the first spring 441 is equipped with a limit hole 4421 for the first spring 441 to insert into, or a limit post for the first spring 441 to set on (in one embodiment, FIG. 14 shows a limit hole 4421); the end of the top block 442 facing the movable pinion 4312' has a working surface in contact with the movable pinion 4312'.

Each pinion 4312 corresponds to a tooth groove 4112, respectively. In one embodiment, there are 9 pinions 4312. In other embodiment, there are 3-20 pinions 4312. In one embodiment, the movable pinion 4312' is the first pinion used to embed in the first tooth groove 4112'. Making the first pinion movable ensures that the first tooth groove 4112' is received better. For example, when triggered, if the movable pinion 4312' just touches the tooth block 4111, because the movable pinion 4312' is movable, it will be pushed by the reaction force of the tooth block 4111 to make a slight movement within the oval hole 43112, and embed in the first tooth groove 4112' under the action of the first spring 441 (as shown in FIG. 15), enabling the first pinion and the first tooth groove to coordinate properly to avoid jamming. When each pinion 4312 continues to rotate counterclockwise following the rotating part 4311, each pinion gradually received into each corresponding tooth groove 4112, thereby gradually driving the striking member 411 to move to the right (as shown in FIG. 15). Counterclockwise, the pinions from the first to the nth are evenly distributed at the edge of the rotating part 4311, and there is an equal distance of the first gap between every two adjacent pinions 4312. Clockwise, a second gap is formed between the first pinion and the nth pinion, and the second gap is larger than the first gap. When the rotating part 4311 runs to the second gap towards the striking member 411, since no pinion is set between the second gap, the rotating part 4311 and the striking member 411 are in a toothless state at this time, and the striking member 411 under this state can be triggered by the energy storage member to move in the direction of the strike, thereby striking the nail.

As shown in FIG. 13, the limiting disk 433 is a ratchet disposed coaxially with the rotating part 4311. The ratchet and the rotating part 4311 are both disposed on the output shaft 51 of the nail gun's motor and are connected and fixed together with the rotating part 4311 through a pin, and they rotate synchronously with the rotating part 4311 under the drive of the motor. The periphery of the ratchet is equipped with several ratchet teeth 4331. The limiting component 432 has a ratchet claw 4321 that matches the ratchet teeth 4331 and is received between adjacent ratchet teeth 4331. As shown in FIG. 13, the distance between adjacent ratchet teeth 4331 is smaller than the width of the tooth groove 4112, making the ratchet claw and ratchet teeth matching more secure and firm, and thus not easy to come out. This embodiment adopts the above-mentioned method of the ratchet claw and ratchet teeth matching, which is much more secure and firm compared to the prior art of using the ratchet claw to directly match with the tooth groove 4112, because the distance between the ratchet teeth 4331 is far smaller than the width of the tooth groove 4112, the problem of ratchet teeth coming off, which occurs in existing technology, is less likely to happen. During the operation, the limiting disk 433 can also be ratchet teeth disposed directly and integrally on the rotating part 4311. In one embodiment, the rotating part 4311 is made thicker for directly incorporating the ratchet teeth on the periphery of the upper part of the rotating part 4311 (this implementation method is not shown in the figure). This method ensures that the limiting disk 433 rotates synchronously with the rotating part 4311, while reducing the number of parts. But it has higher requirements for the processing technology of the rotating part 4311.

As shown in FIG. 11, the energy storage mechanism 42 includes a storage component 45, an inflation component 46, and a pressure relief component 47. The storage component 45 has an outer cylinder 451 and an inner cylinder 452. The outer cylinder 451 includes an outer cylinder body 4511 and a rear cover 4512, disposed at a rear end of the outer cylinder body 4511, which can be detached. The inside of the outer cylinder body 4511 is hollow, forming an air chamber 453. Within the outer cylinder body 4511, the inner cylinder 452 is installed. The inner cylinder 452 has a long cylindrical structure, in which the striking mechanism 41 is installed. The piston part 412 of the striking mechanism 41 adheres to the inner wall of the inner cylinder 452. A sealing ring 413 is pressed between the piston part 412 and the inner wall of the inner cylinder 452. The striking member 411 is affixed to the piston part 412, with its front end extending out of the inner cylinder 452 and the front end of the outer cylinder body 4511 to cooperate with the transmission component 431. As illustrated in FIG. 11, the piston part 412 and the sealing ring 413 divide the inside of the inner cylinder 452 into two separate parts: the first chamber 4521 and the second chamber 4522. The volumes of these two parts change as the piston part 412 moves. The second chamber 4522 is connected to the air chamber 453, while the first chamber 4521 is isolated from the second chamber 4522 and is open to the outside. The front end of the inner cylinder 452 has an inner through hole 4523 connecting the first chamber 4521 to the outside. By making the rear cover 4512 detachable, it is easier to dismantle the outer cylinder to replace or repair the striking mechanism 41 disposed therein. To ensure the air chamber is sealed, a first seal 4513 is placed where the rear cover 4512 connects to the outer cylinder body 4511, enhancing the connection tightness and preventing air leakage from the air chamber 453. In this embodiment, the first seal 4513 is a sealing ring, as shown in FIG. 17.

In one embodiment, the air chamber 453 is filled with air or nitrogen. As the striking mechanism 41 is installed inside the inner cylinder 452, when the striking member 411 is moved by the transmission component 431, the piston part 412 moves towards the direction of the second chamber 4522. The volume of the second chamber 4522 gradually decreases, compressing the gas inside the air chamber 453 and increasing the pressure, thus storing energy. When the rotating part 4311 of the transmission component 431 rotates to the second gap facing the striking member 411 (i.e., when the striking member 411 is in a gap state), the pressure inside the air chamber 453 can push the striking mechanism 41 in the striking direction, accomplishing the nailing action.

Figure 17:
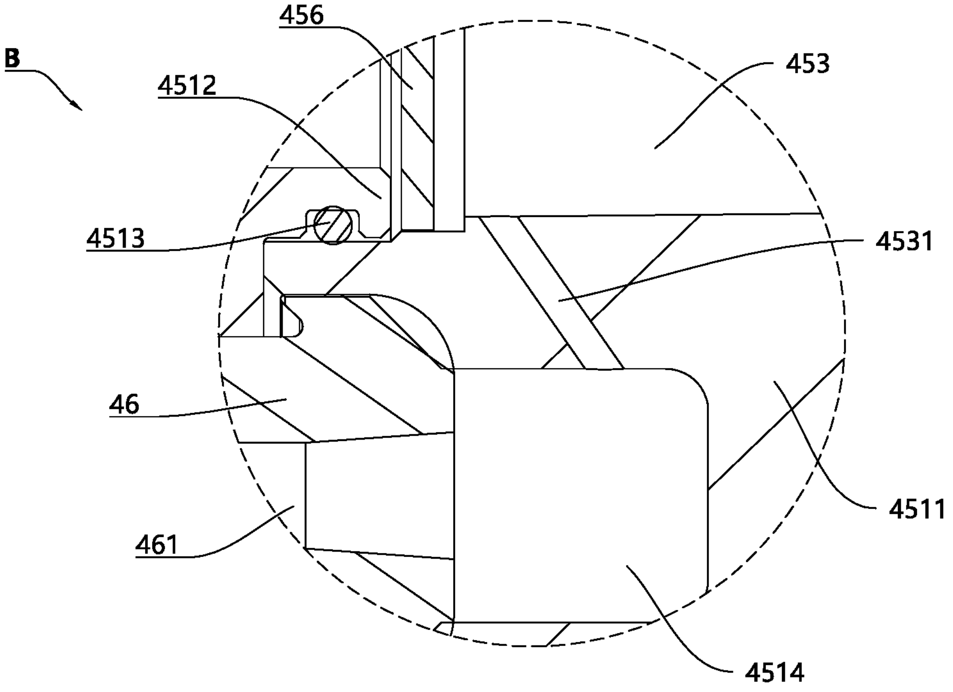
FIG. 17 is an enlarged view of part B of FIG. 11.

FIG. 17 is an enlarged view of the B section of FIG. 11.

In order to conveniently supplement the air in the air chamber 453, an inflation component 46 is provided at one end of the outer cylinder body 4511 near the rear cover 4512. As shown in FIGS. 11 and 17, an air inlet 4514 is provided at the position of the outer cylinder body 4511 close to the rear cover 4512, and an air intake passage 4531 that communicates the air chamber 453 and the air inlet 4514 is provided on the side of the outer cylinder body 4511 at the air inlet 4514. The inflation component 46 is an inflating nozzle with an inflation channel 461 in the middle. The inner end of the inflation nozzle is inserted at the air inlet 4514, and the outer end extends out of the outer cylinder body 4511 and is exposed to the outside, making it convenient for users to inflate the inflating nozzle.

Figure 18:
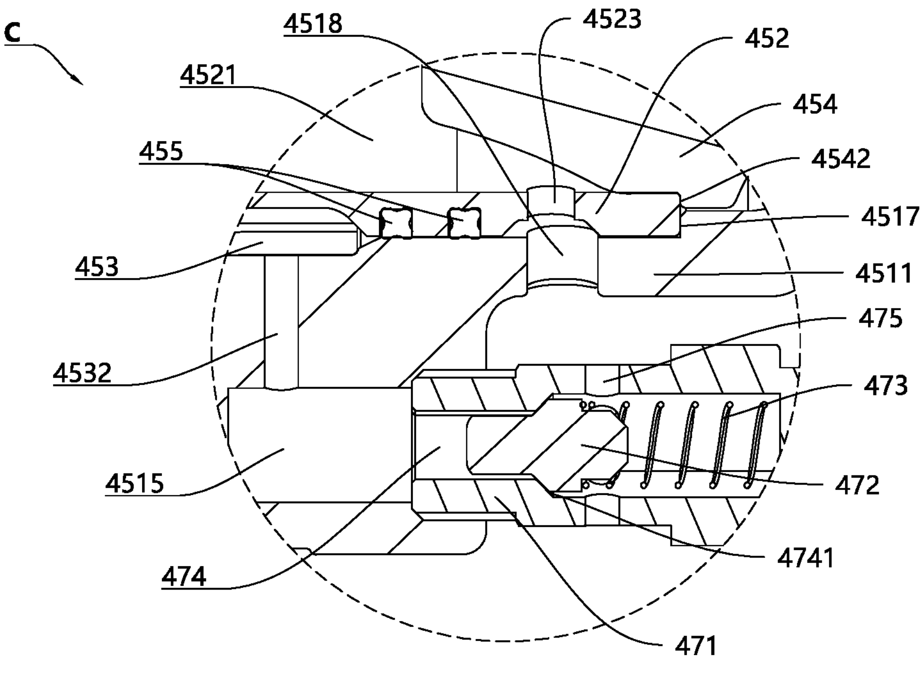
FIG. 18 is an enlarged view of part C of FIG. 11.

FIG. 18 is an enlarged view of the C section in FIG. 11.

A pressure relief component 47 is provided on one side of the front end of the outer cylinder body 4511. In one embodiment, the pressure relief component 47 is an automatic pressure relief valve. When the air pressure in the air chamber 453 gradually increases and reaches a predetermined value, the automatic pressure relief valve will automatically open to relieve the pressure in the air chamber 453, so that the air pressure in the air chamber 453 always remains below the predetermined value, ensuring the safety of the interior of the outer cylinder body 4511. In addition, the outer end of the pressure relief component 47 is exposed on the outside of the outer cylinder body 4511. When the user needs to disassemble and check the outer cylinder 451, the pressure relief valve can be opened manually first, to release the air inside the air chamber 453 before disassembly, avoiding the high internal pressure of the air chamber 453 from causing the striking member 41 to be accidentally triggered and harm the user, enhancing the safety of the product.

Specifically, as shown in FIG. 18, a pressure relief port 4515 is provided on one side of the front end of the outer cylinder body 4511, and a pressure relief passage 4532 communicating this pressure relief port 4515 with the air chamber 453 is provided on the outer cylinder body 4511. The automatic pressure relief valve has a pressure relief valve body 471, a pressure relief valve core 472, and a pressure relief spring 473. One end of the pressure relief valve body 471 is securely installed in the pressure relief port 4515, and the other end extends out and is exposed on the outside of the outer cylinder body 4511. A pressure relief chamber 474 communicating with the pressure relief port 4514 is provided in the middle of the pressure relief valve body 471. A pressure relief hole 475 that communicates the pressure relief chamber 474 and the outside environment is provided on the side of the pressure relief valve body 471. The pressure relief valve core 472 is moveably disposed in the pressure relief chamber 474 by the pressure relief spring 473, and a limit blocking surface 4741 that cooperates with the pressure relief valve core 472 is formed on the inner side wall of the pressure relief chamber 474. In the closed state of the automatic pressure relief valve, the pressure relief valve core 472 is blocked at the junction of the pressure relief chamber 474 and the pressure relief port 4515 under the action of the pressure relief spring 473. At this time, the pressure relief valve core 472 is tightly attached to the limit blocking surface 4741, and the air in the air chamber 453 cannot be discharged. When the air pressure in the air chamber 453 gradually increases and exceeds the predetermined value, the air will enter the pressure relief chamber 474 through the pressure relief passage 4532 and the pressure relief port 4515 and gradually push the pressure relief valve core 472. When the pressure relief valve core 472 is pushed away from the limit blocking surface 4741 to form a gap, the air can pass through the gap and be discharged from the pressure relief hole 475, thereby relieving the pressure inside the air chamber 453. When the air pressure in the air chamber 453 drops to the predetermined value, under the action of the pressure relief spring 473, the pressure relief valve core 472 will be pushed back to its original position, making it closely attach to the limit blocking surface 4741. The automatic pressure relief valve does not need to be manually started when it is working, and it can automatically open according to the changes inside the air chamber 453, providing protection for the air chamber 453.

Figure 19:
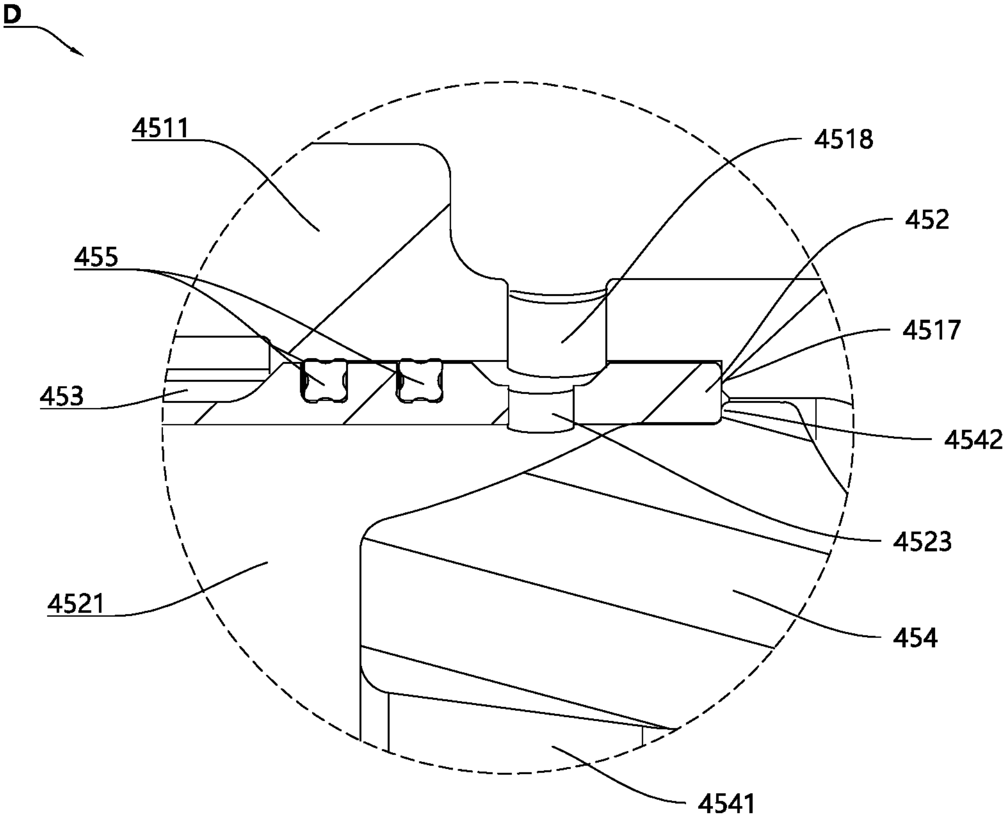
FIG. 19 is an enlarged view of part D of FIG. 11.

FIG. 19 is an enlarged view of section Din FIG. 11.

As shown in FIG. 11, the front end of the inner cylinder 452 is fixedly connected with the front end of the outer cylinder 451, and a buffer pad 454 is provided at the connection point. A through hole 4541 is provided in the middle of the buffer pad 454 for the front end of the striking member 41 to extend out. The inner end face of the buffer pad 454 is used to cushion the piston part 412. The piston part 412 is pushed forward by the air pressure in the air cavity 453 (in the striking direction). The piston part 412 can move until it is stopped by the buffer pad 454. The buffer pad 454 can provide blockage and buffering for the piston part 412, preventing it from directly colliding with the inner side of the outer cylinder body 4511, thereby protecting the piston part 412.

As shown in FIGS. 18 and 19, in one embodiment, the specific installation structure of the buffer pad 454 is as follow. The cross section of the inner cylinder 452 has an annular sleeve structure, the outer periphery of the buffer pad 454 is formed with an installation protruding ring 4542, and the front end of the outer cylinder body 4511 forms a limiting surface 4516 and an installation snap ring 4517. The front end of the buffer pad 454 is pressed against the limiting surface 4516 (as shown in FIG. 11), and the front end of the inner cylinder 452 is pressed against the installation protruding ring 4542 and the installation snap ring 4517, thereby achieving the connection between the buffer pad 454, the inner cylinder 452, and the outer cylinder body 4511. As shown in FIG. 19, a third seal 455 is provided between the outer periphery of the inner cylinder 452 and the inner wall of the outer cylinder body 4511. In one embodiment, the third seal 455 has two sealing rings, and the front end of the outer cylinder body 4511 is provided with an outer through hole 4518 on the outer side of the inner through hole 4523. The inner through hole 4523 and the outer through hole 4518 are connected to each other, thus connecting the first chamber 4521 to the outside environment. In the cross-sectional view, the inner through hole 4523 and the outer through hole 4518 are located at the front of the third seal, the air chamber 453 is located at the back of the third seal, the third seal 455 not only enhances the tightness of the connection but also separates the air chamber 453 from the first chamber 4521, forming two independent spaces and avoiding the air chamber 453 from being connected to the outside environment and affected by the external air pressure.

Figure 16:
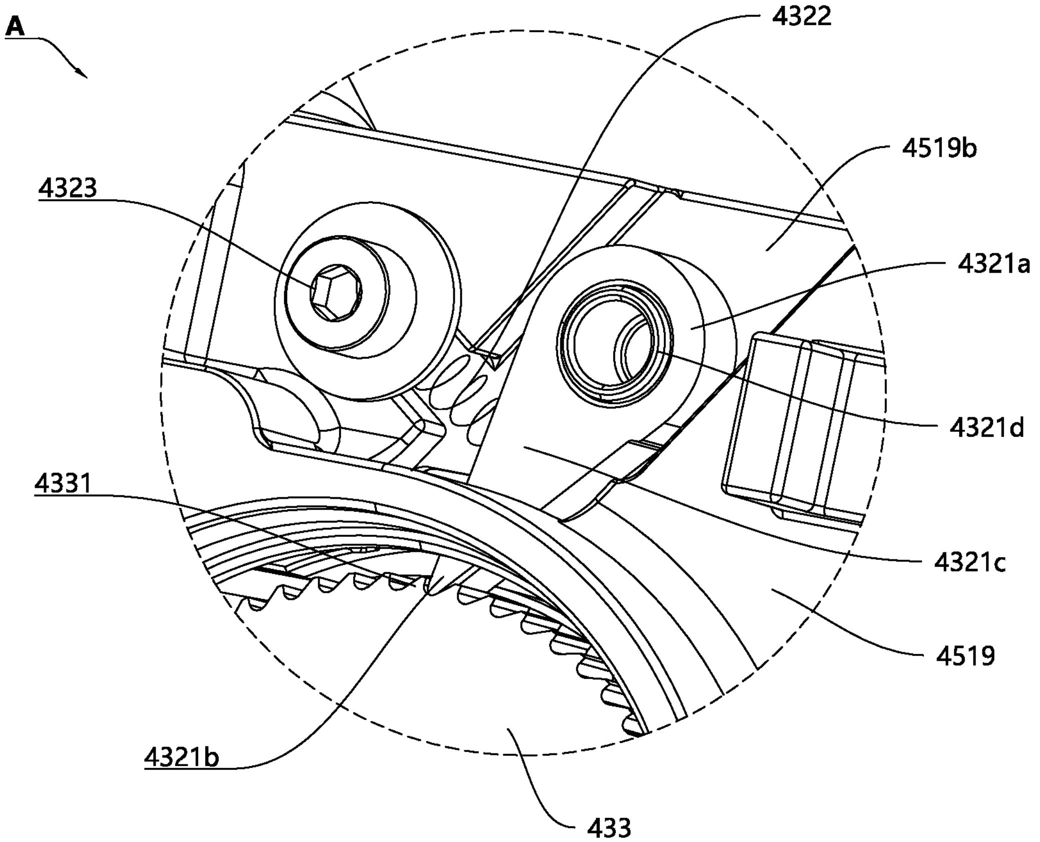
FIG. 16 is an enlarged view of part A of FIG. 10.

FIG. 16 is an enlarged view of part A in FIG. 10.

Figure 20:
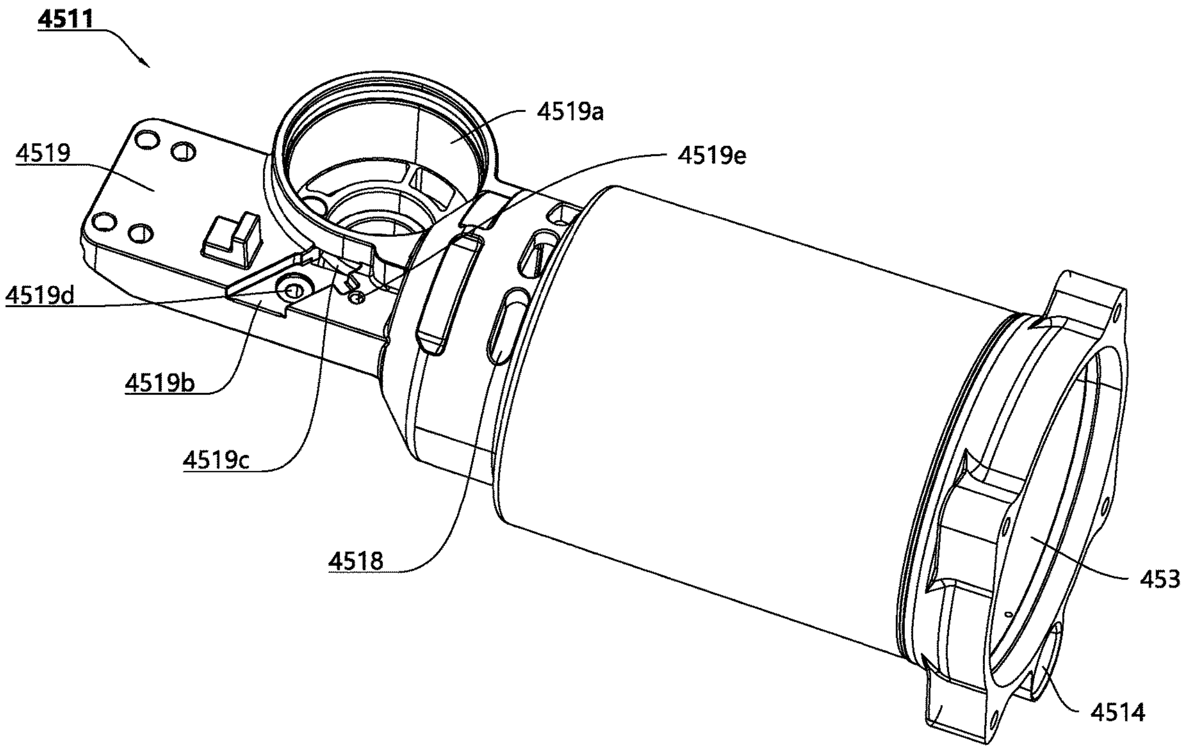
FIG. 20 is a schematic structural view of an outer cylinder body according to one embodiment of the invention.

FIG. 20 is a schematic structural view of an outer cylinder body according to one embodiment of the invention.

Figure 21:
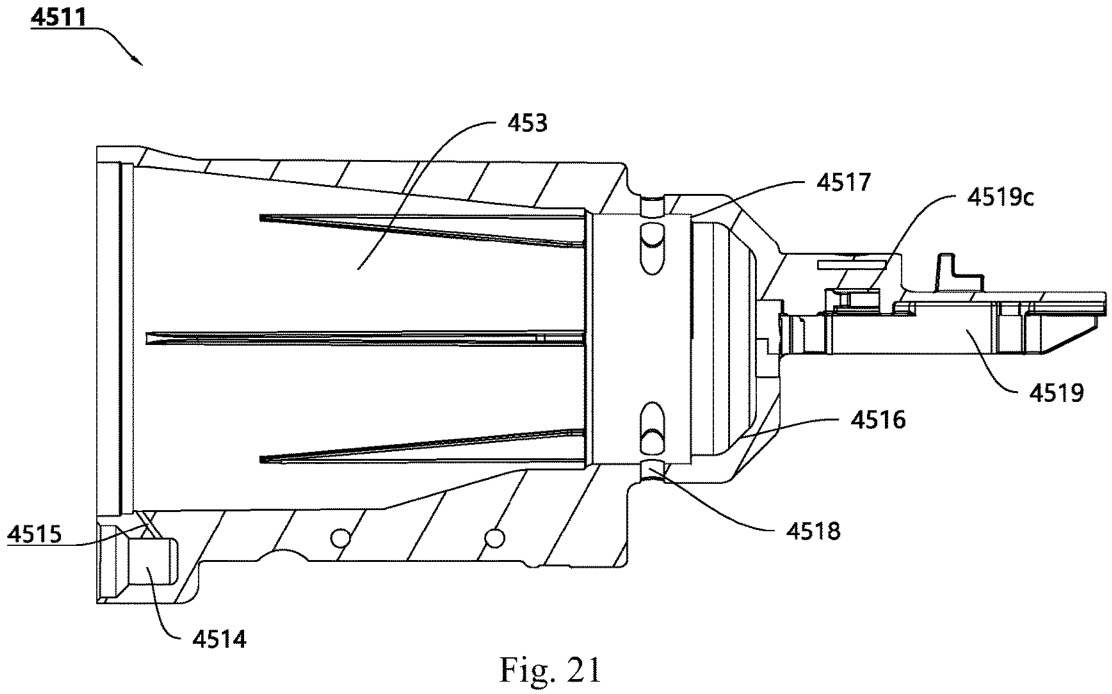
FIG. 21 is a cross-sectional view of the outer cylinder body according to one embodiment of the invention.

FIG. 21 is a cross-sectional view of the outer cylinder body according to one embodiment of the invention.

As shown in FIG. 20, a mounting portion 4519 is provided at the front end of the outer cylinder body 4511. The mounting portion 4519 is shaped with a recess 4519*a* for mounting driving members 43, and the recess 4519*a* has a shape that matches the rotating part of the driving member 43, namely, annular. A mounting groove 4519*b* is provided on one side of the mounting portion 4519 where the recess 4519*a* is located. The ratchet claw 4321 is mounted in the mounting groove 4519*b*, and a hole 4519*c* is provided on the side of the recess 4519*a* facing the mounting groove 4519*b* for one end of the ratchet claw 4321 to pass through.

As shown in FIG. 16, the ratchet claw 4321 has a positioning end 4321*a*, a limiting end 4321*b*, and a connecting section 4321*c*. The positioning end 4321*a* is rotatably mounted in the mounting groove 4519*b* through a rotating shaft 4321*d*. The limiting end 4321*b* extends into the recess 4519*a* through a hole 4519*c* on the side wall of the recess 4519*a* to engage with the ratchet tooth 4331 in the recess 4519*a*. The connecting section 4321*c* is the part connecting the positioning end 4321*a* and the limiting end 4321*b*. One side of the connecting section 4321*c* is provided with a second spring 4322. A positioning screw 4323 is inserted into the mounting part 4519 to provide support for one end of the second spring 4322. The two ends of the second spring 4322 are respectively abutted on the positioning screw 4323 and the connecting section 4321*c*. Under the action of the second spring 4322, the limiting end 4321*b* of the ratchet 4321 can better cooperate with the ratchet tooth 4331, so that the limiting end 4321*b* is embedded in the ratchet tooth 4331, avoiding the reverse rotation of the ratchet. Meanwhile, as shown in FIG. 20, positioning holes 4519*d* and 4519*e* are provided on the mounting portion 4519 corresponding to the rotating shaft 4321*d* and the positioning screw 4323, respectively for mounting the rotating shaft 4321*d* and the positioning screw 4323. The cooperation between the ratchet tooth 4331 and the ratchet 4321 can prevent the ratchet from reversing. Because the ratchet is coaxially arranged with the rotating part, it can prevent the rotating part from reversing, thus preventing the striking member component from misfiring and increasing safety.

Figure 22:
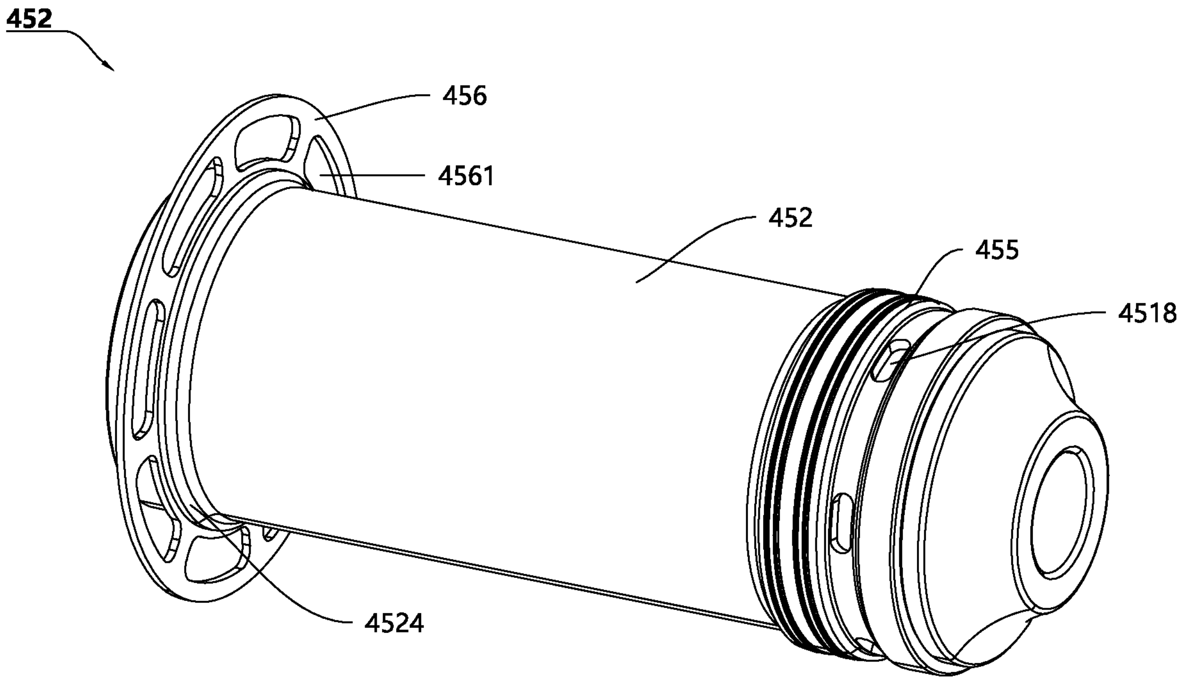
FIG. 22 is a schematic structural view of an inner cylinder body according to one embodiment of the invention.

FIG. 22 is a schematic structural view of an inner cylinder body according to one embodiment of the invention.

Figure 23:
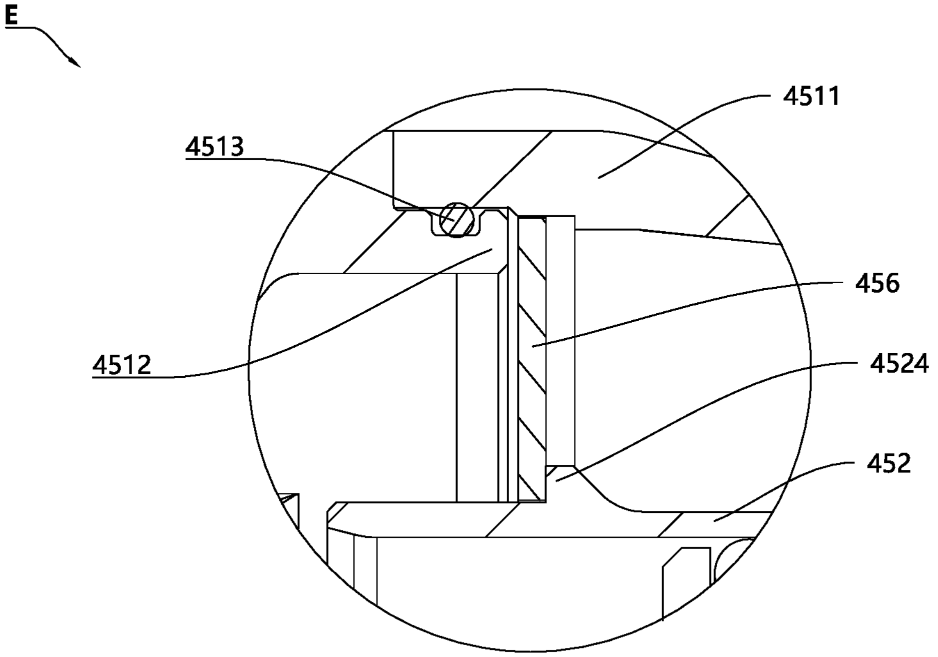
FIG. 23 is an enlarged view of part E of FIG. 11.

FIG. 23 is an enlarged view of part E of FIG. 11.

As shown in FIGS. 11 and 23, the inner cylinder 452 is installed inside the outer cylinder body 4511, and the front end of the inner cylinder 452 is connected and locked to the inner wall of the outer cylinder body 4511 through the third seal 455. In order to allow the inner cylinder 452 to be more stably disposed inside the outer cylinder body 4511, as shown in FIG. 22, a protruding ring 4524 is provided at one end of the inner cylinder body 452 far from the third seal 455, and a positioning ring 456 is provided on one side of the protruding ring 4524. The positioning ring 456 has an air passage 4561. As shown in FIG. 23, the inner periphery of the positioning ring 456 is sleeved on the outer periphery of the inner cylinder body 452, and one side is abutted by the protruding ring 4524. The outer periphery of the positioning ring 456 is blocked by the end face of the rear cover body 4512 facing the outer cylinder body 4511, so that the movement of the positioning ring 456 can be limited between the rear cover body 4512 and the protruding ring 4524, enhancing the connection stability of the structure. The third seal 455 and the positioning ring 456 are respectively disposed at the front and rear ends of the inner cylinder 452, supporting both ends of the inner cylinder 452, allowing the inner cylinder 452 to be more stably fixed inside the outer cylinder body 4511.

Working Principle of this Embodiment

When the control mechanism 50 activates the drive motor, the motor drives the transmission component 431 to rotate. During the rotation of the rotating part 4311, the pinions 4312 begins to progressively mesh with the tooth grooves 4112 on the striking member 411, starting with the movable pinion 4312'. This rotation drives the striking member 411 and the piston part 412 to move within the inner cylinder 452 in the direction opposite to the striking direction. As the piston part 412 moves, the volume of the second chamber 4522 gradually decreases, compressing the air inside the air chamber 453. The air pressure inside the air chamber 453 gradually increases, storing energy. When the rotating part 4311 continuously rotates such that a gap formed between the rotating part 4311 and the firing striking member 411, the compressed air inside chamber 45 pushes the piston part 412 and the striking member 411 in the striking direction, causing the striking member 411 to strike the nail, completing the nailing process.

During the rotation of the rotating part 4311, the ratchet also rotates with the rotating part 4311. The ratchet claw 4321 meshes with the teeth 4331 on the outer circumference of the ratchet, preventing the ratchet from reversing, thereby effectively avoiding accidental activation of the striking member 41 during operation, enhancing safety.

Function and Effects of the Embodiment

According to the nail passage mechanism 32 of this embodiment, when the nail is fed by the magazine mechanism 31, it is precisely positioned over the nail hole 331. Due to the protruding blocking rim 332 on the muzzle member 33, which is located on one side of the nail hole 331 and protrudes from the nail passing channel 35 surface, it can obstruct the side of the nail. This ensures that when the nail is struck, it can only be discharged in the striking direction and will not deviate to the side. This ensures the accuracy of the nailing and prevents the nail from jamming in the nailing channel due to uneven forces.

In one embodiment, the muzzle member 33, located on the front side of the nail hole 331 and in the direction of nail ejection, has a magnet installation hole 333 for installing a magnet, ensuring that nails do not fall out. When the user is not nailing and is merely holding the nail gun, and if the muzzle mechanism is facing downwards, the nail at the nail hole 331 may fall out. Since most nails are made of metal materials, e.g. iron, a magnet is placed in the direction of nailing to magnetically attract the nail, ensuring it does not easily fall out, enhancing safety.

Directly disposed on the transmission component 431, a limiting disk 433 designed to cooperate with the limiting component 432, which restricts the movement of the striking member 411. This eliminates the need for additional structures on the striking member 411 to cooperate with the limiting component 432. This simplifies the structure of the striking member 411. And since there is no direct contact between the limiting component 432 and the striking member 411, there is no need to release the limiting relationship between them when the striking member 411 is launched. This avoids the need for special driving mechanisms like solenoid valves at the location of the limiting component 432, simplifying the structure, reducing costs, and resolving defects brought about by solenoid valve failures, making the entire nail gun more efficient, stable, and safe during operation.

The transmission component 431 of one embodiment includes a rotating part 4311 and a matching part. The rotating part connects to the drive motor and rotates through the motor's drive. The matching part includes several pinions 4312 distributed on the rotating part 4311. They are received in the tooth grooves 4112 of the striking member 411, facilitating the cooperation between the transmission component 431 and the striking member 411, driving the striking member 411 to move. The engagement of the pinions 4312 and the tooth grooves 4112 offers more stable transmission compared to the meshing of gears and racks.

The limiting disk 433 of one embodiment is a ratchet disposed coaxially with the rotating part 4311, and its outer perimeter has several ratchet teeth 4331. The limiting component 432 is a ratchet claw 4321 that meshes with the ratchet teeth 4331, designed to nest between adjacent ratchet teeth 4331. Disposing the ratchet coaxially with the rotating part 4311 ensures that they rotate synchronously. The ratchet claw 4321 and the ratchet interact to restrict the reverse rotation of the rotating part 4311, thereby controlling the movement of the striking member 411, enhancing safety. Moreover, both the ratchet and the rotating part 4311 are driven directly by the same motor, eliminating the need for an additional power source, simplifying the structure, reducing costs, lightening the weight, and making it more convenient for carrying and usage.

In one embodiment, the spacing between the ratchet teeth 4331 on the ratchet is smaller than the width of the tooth groove 4112 on the striking member 411. Compared to the direct cooperation of the ratchet claw 4321 with the tooth groove 4112, this design offers a more stable connection. The smaller the spacing, the higher the precision and tightness of engagement of the ratchet claw 4321, significantly reducing or even eliminating the possibility of the ratchet claw 4321 disengaging. This in turn lowers the probability of accidental discharge of the striking member 411, enhancing safety.

In one embodiment, the pinions 4312 have at least one movable pinion 4312'. When the transmission component 431 cooperates with the striking member 411, each of the pinions 4312 need to fit into each of the tooth grooves 4112 respectively. During the operation, there exists a chance that the pinion 4312 fail to align perfectly with the tooth groove 4112, causing the pinion 4312 to collide directly with the tooth block 4111, preventing proper meshing and causing jams. By designing the pinion 4312 to be movable, when the movable pinion 4312' collides with the tooth block 4111, it will make slight adjustments due to the impact force, accurately fitting into the tooth groove 4112. This prevents the transmission component 431 and the striking member 411 from jamming, reducing the chances of accidental nail discharging and potential injury, further enhancing safety.

In one embodiment, the energy storage mechanism 42 includes two cylindrical bodies, an inner cylinder 452 and an outer cylinder 451. An air chamber 453 is formed between these two bodies. The inner cylinder 452 is disposed inside the outer cylinder body 4511 of the outer cylinder 451. Inside the inner cylinder 452 is the striking mechanism 41, which achieves nailing by changing the air pressure in the air chamber, driven by the transfer mechanism 43. The back of the outer cylinder body 4511 is equipped with a detachable back cover 4512, facilitating easy disassembly and maintenance or replacement of the striking mechanism 41 inside the inner cylinder 452.

Due to the pressure relief component 47 leading to the air chamber 453, the energy storage mechanism 42 of this embodiment will automatically release pressure from the air chamber 453 when the internal pressure exceeds a predetermined safety threshold. This ensures the air pressure within the chamber always remains below this safety threshold, guaranteeing equipment safety. Simultaneously, the energy storage mechanism 42 also includes an inflation component 46 leading to the air chamber 453, allowing for convenient inflation when needed.

A mounting portion 4519 is integrally formed on the outer cylinder 451 of this energy storage mechanism. This mounting portion 4519 is used to install the transmission component 431. By manufacturing the mounting portion 4519 as a universal component, it allows for compatibility with different striking member. When there is a need to accommodate different striking member, one only needs to replace the corresponding striking member 411 and transmission component 431, without having to change the entire device, ensuring wide applicability. When users need to perform various tasks, there is no need to carry different nail guns for different nails; simply carrying the appropriate striking member and driving member will suffice, offering great portability.

Embodiment 2

In one embodiment, the present invention provides a driving mechanism having a driving wheel, and a nail gun having the same to solve the problem of the last tooth pinion being easily worn out.

In one embodiment, the present invention provides a driving wheel in connection with the nail gun's drive motor. The driving wheel rotates under the drive of the motor, and mesh with and transmit power to the nail gun's striking member.

In one embodiment, the driving wheel includes a rotating part, driven by the drive motor for rotation. Several pinions are disposed on or in the rotating part for meshing and transmitting power with the striking member. Among the pinions, there is a releasable pinion that is slidably connected with the rotating part.

In one embodiment, the driving wheel has a spring member, positioned between the releasable pinion and the rotating part, with the rotating part having a movable hole for the movement of the releasable pinion.

In one embodiment, the driving wheel also has a spring chamber for installing a spring member. The spring member has a spring with one end placed in the spring chamber and the other end acts on the releasable pinion.

In one embodiment, the movable hole of the driving wheel is an arc-shaped slot.

In one embodiment, the spring member of the driving wheel also has a top block, located between the spring and the releasable pinion. The side of the top block facing the spring has a limit hole for the spring to insert or a limiting post for the spring to set over. The end of the top block facing the releasable pinion has a contact surface.

In one embodiment, the rotating part of the driving wheel also has a clearance notch.

In one embodiment, the driving wheel also has a first pinion among the several pinions, and the clearance notch is located between the releasable pinion and this first pinion.

In one embodiment, the driving wheel also has a second spring member, which includes a second spring. One end of the second spring acting on the rotating part and the other end acting on the first pinion. The rotating part has a second spring chamber to house the second spring, and a second movable hole locates on the rotating part for the movement of the first pinion.

In one embodiment, the driving wheel also has an extension direction of the second movable hole is parallel to the extension direction of the second spring chamber.

In one embodiment, the present invention also provides a driving mechanism of nail gun and includes at least a driving wheel and a striking member.

In one embodiment, the present invention includes a driving wheel which is equipped with a movable hole for the movement of the releasable pinion and a spring member. When the striking member is released, it avoids excessive friction between the striking member and the releasable pinion. This, in turn, prevents wear of the pinions, e.g. releasable pinion.

In one embodiment, the movable hole is an arc-shaped slot. When the tooth blocks of the striking member contact the releasable pinion, the tooth blocks of the striking member rest against the end of the movable hole. This ensures that the releasable pinion is in a stable stress state, preventing the premature release of the striking member.

In one embodiment, the top block slides telescopically within the spring chamber. After the striking member is striking, the extension of the spring resets the releasable pinion.

In one embodiment, the clearance notch reduces the material used in the rotating part, thereby reducing production costs. When the striking member is released for nailing, the clearance notch also provides sufficient clearance space for the striking member.

According to FIGS. 24 to 27, a driving wheel 5010 is connected to a motor of the nail gun. Under the drive of the motor, the driving wheel 5010 rotates, driving the striking member 411 to store energy.

Figure 24:
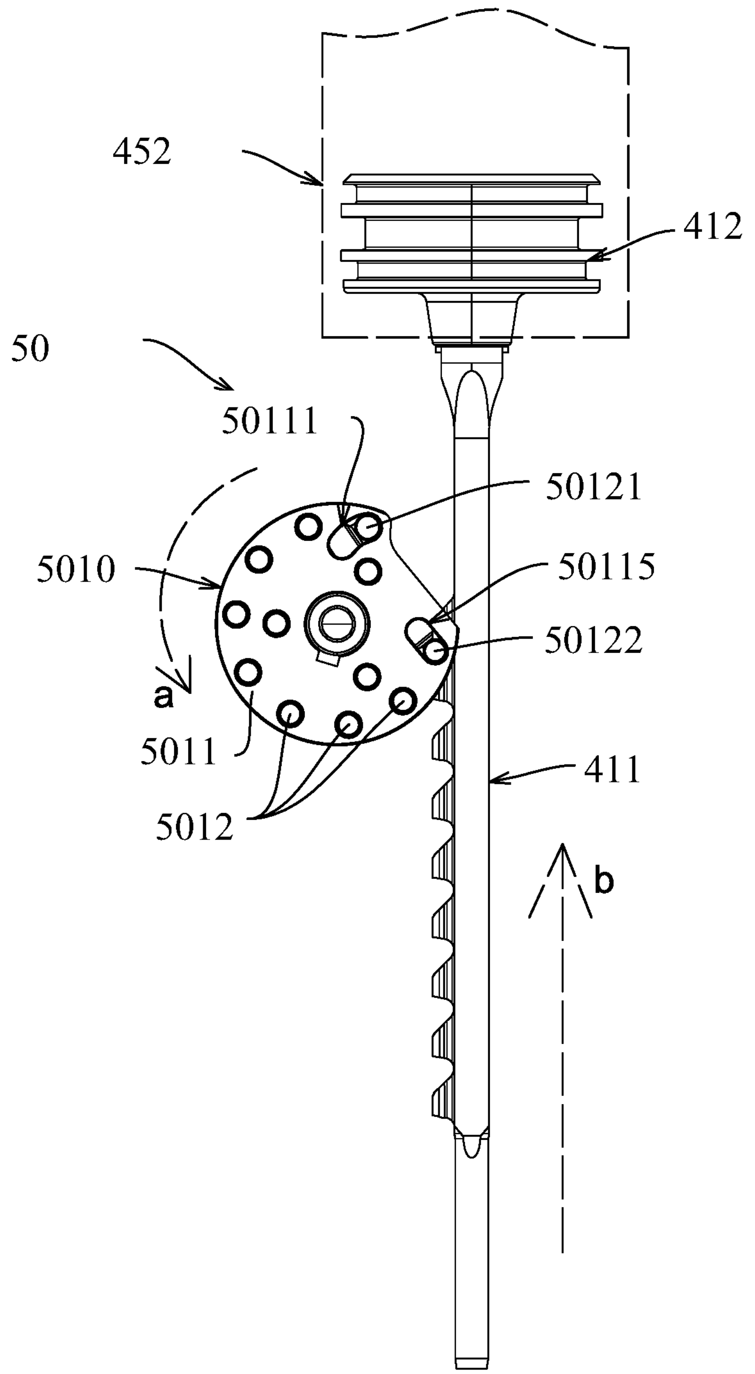
FIG. 24 is a schematic structural view of the driving mechanism in association with the striking mechanism according to one embodiment of the invention.
Figure 25:
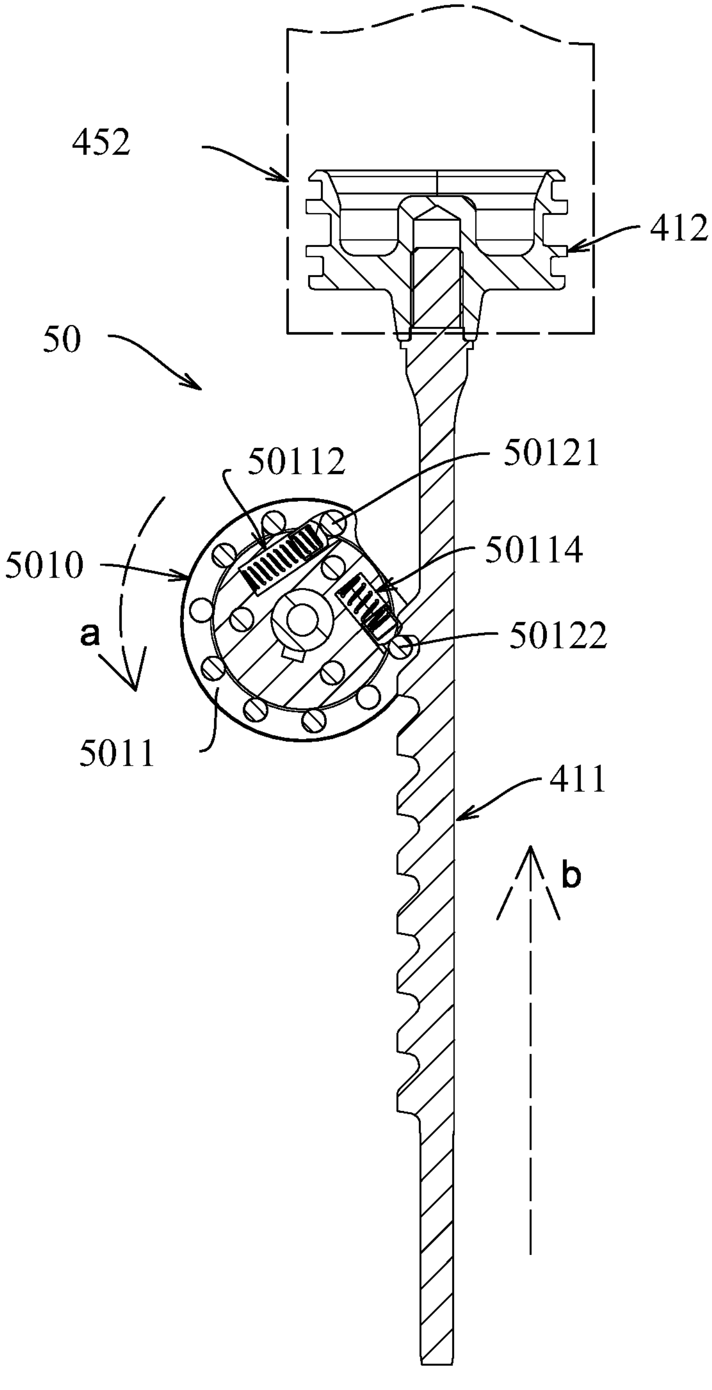
FIG. 25: is a cross-sectional view of FIG. 24 according to one embodiment of the invention.

Specifically, the driving wheel 5010 includes a rotating part 5011 and several pinions 5012. The rotating part 5011 connects to the drive motor and rotates under its drive. The pinions 5012 are arranged circumferentially on the rotating part 5011. These pinions 5012 include a releasable pinion 50121 and a first pinion 50122. The pinions between the releasable pinion 50121 and the first pinion 50122 are evenly distributed. The striking member 411 has more than one tooth blocks on its lateral side that mesh with the pinions 5012. When the drive motor operates, the first pinion 50122 contacts the tooth blocks on the striking member 411, as shown in FIG. 24-25. The striking member 411 starts to rise and store energy. As the rotating part 5011 continues to rotate, as shown by the arrow direction a in FIGS. 24-25, the striking member 411 continues to rise, as shown by the arrow direction b in FIGS. 24-25.

Figure 26:
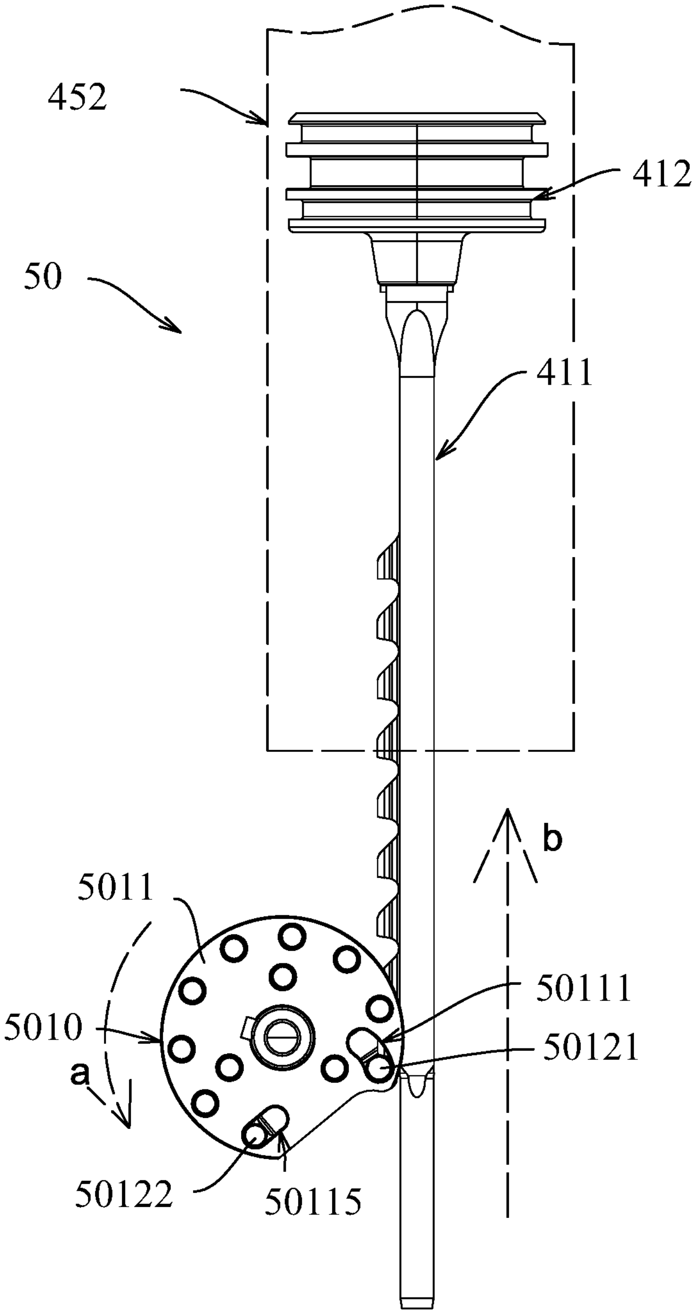
FIG. 26 is a schematic structural view of the driving mechanism in association with the striking mechanism according to another embodiment of the invention.
Figure 27:
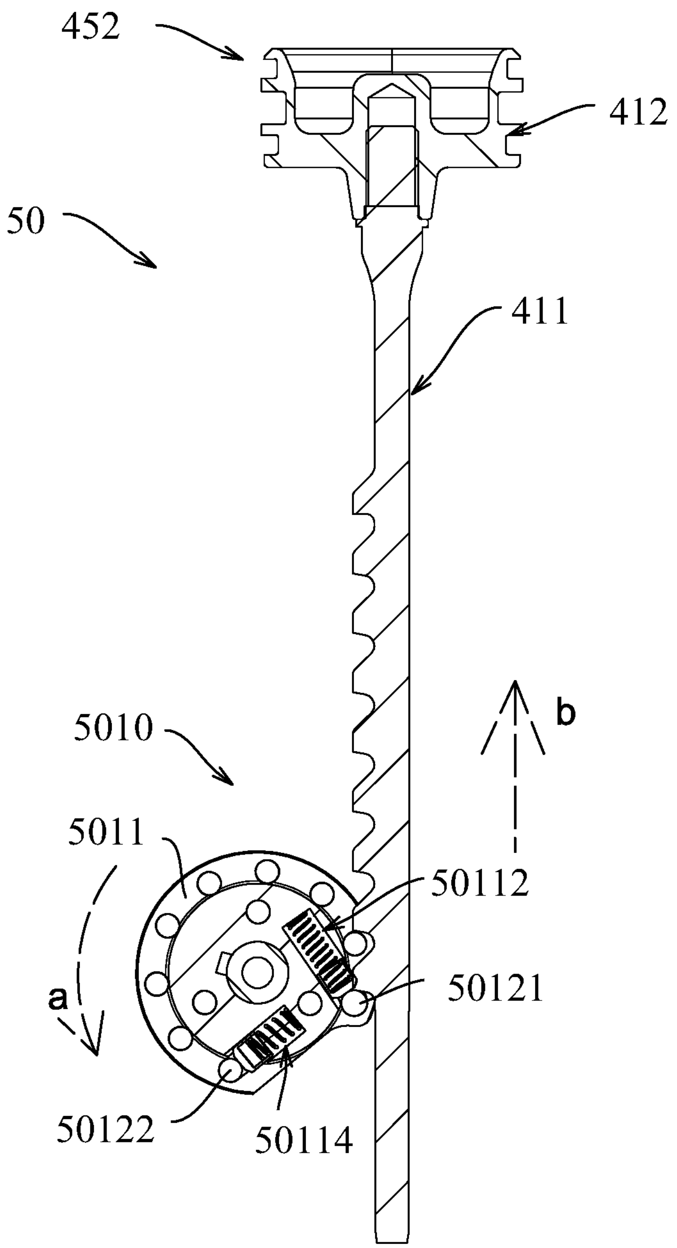
FIG. 27. is a cross-sectional view of FIG. 26 according to another embodiment of the invention.
Figure 28:
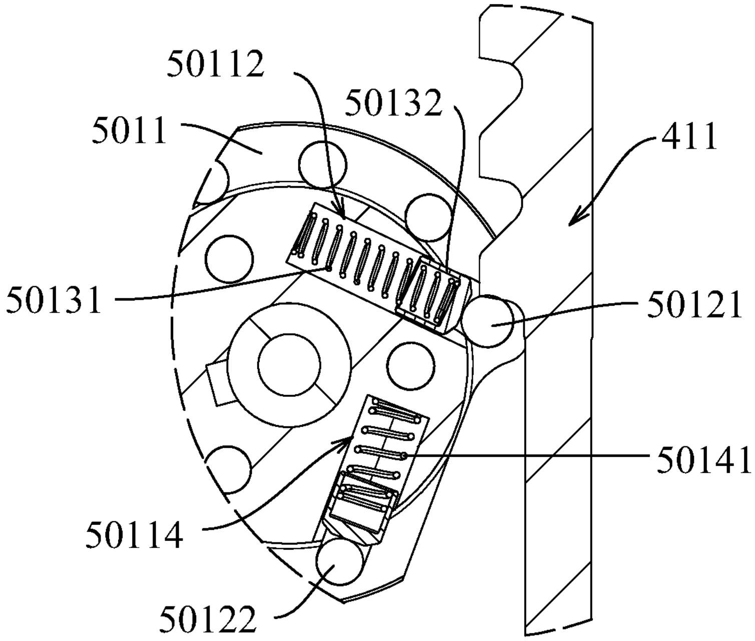
FIG. 28 is an enlarged cross-sectional view of the driving mechanism of FIG. 27 according to one embodiment of the invention.
Figure 29:
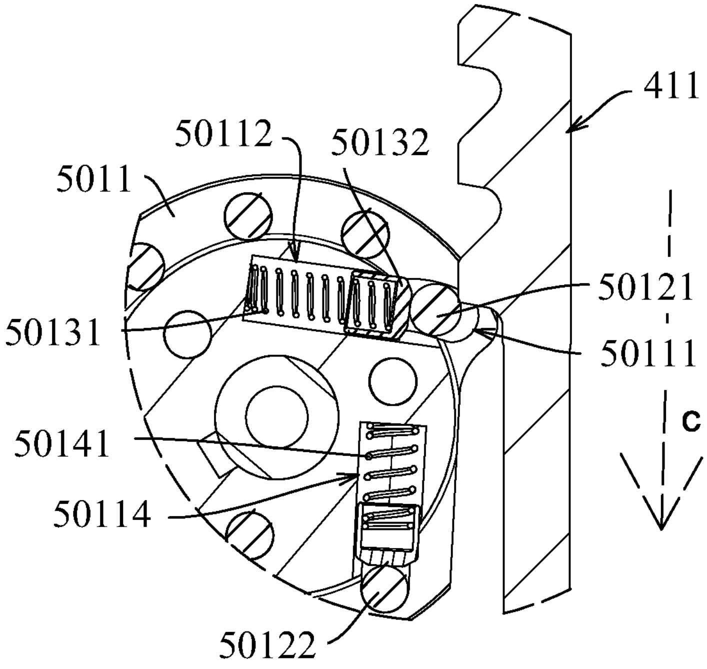
FIG. 29 is another enlarged cross-sectional view of the driving mechanism of FIG. 27 according to one embodiment of the invention.
Figure 30:
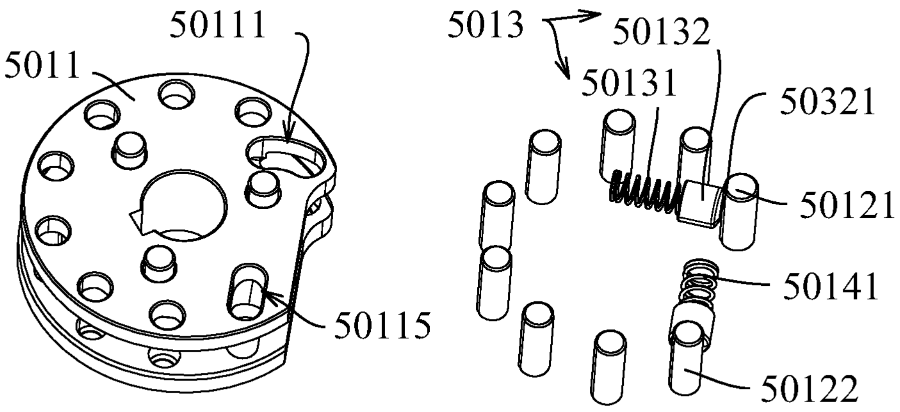
FIG. 30 is an exploded view of the drive wheel according to one embodiment of the invention.
Figure 31:
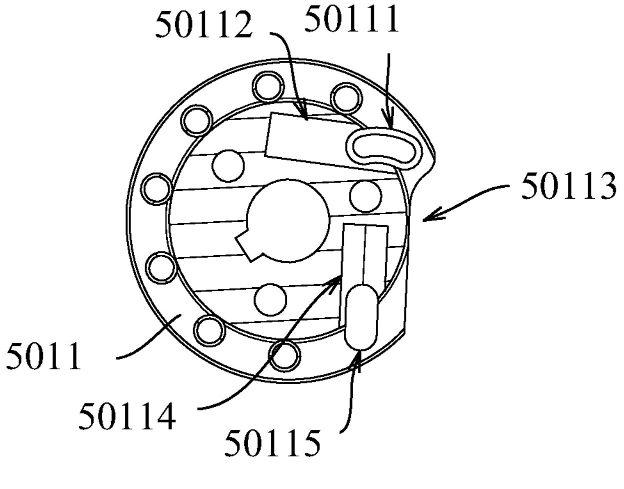
FIG. 31 is a cross-sectional view of the drive wheel in FIG. 30.
Figure 32:
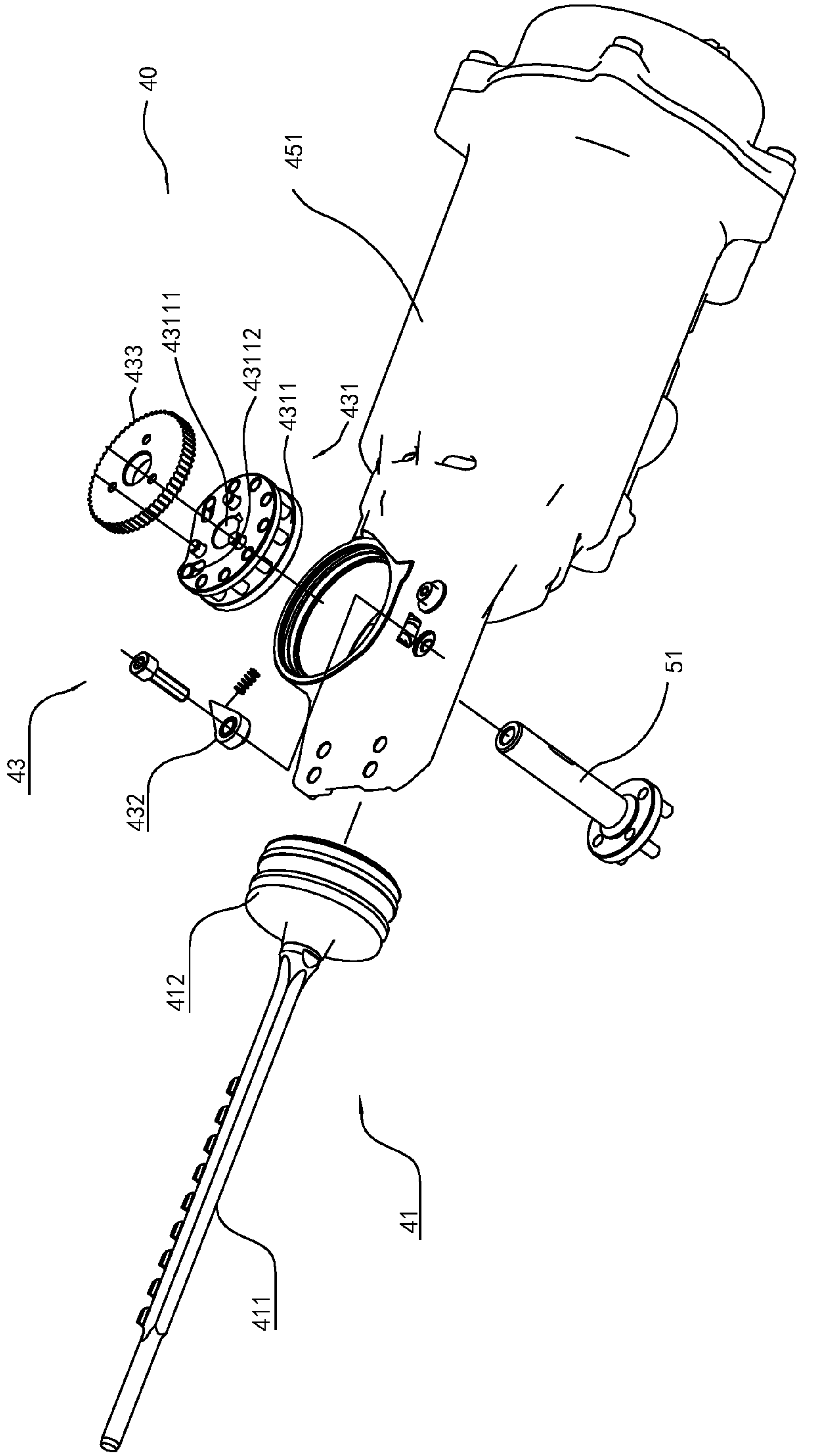
FIG. 32 is an exploded structural view of the energy storage mechanism in association with the driving mechanism according to another embodiment of the invention, where the drive wheel is in accordance with FIG. 30.
Figure 33:
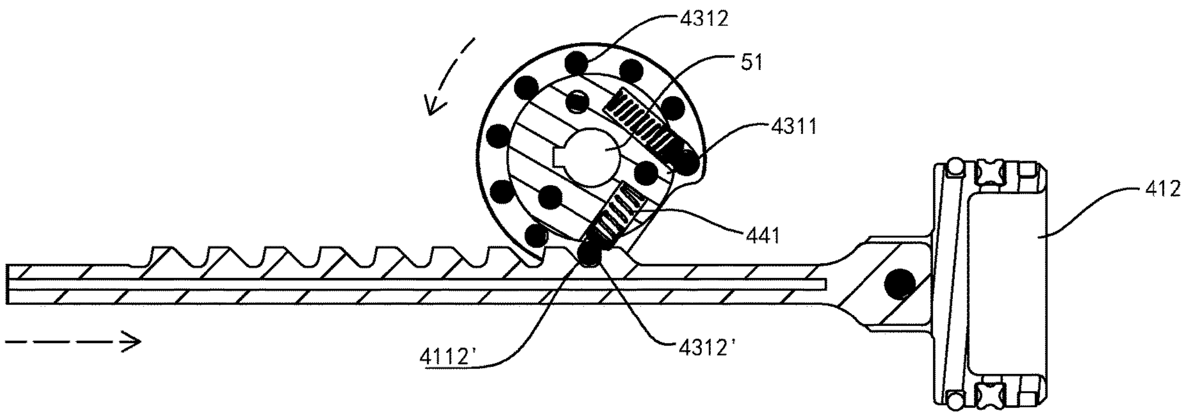
FIG. 33 is a cross-sectional views of the transmission mechanism in association with the striking mechanism according to another embodiment of the invention, where the drive wheel is in accordance with FIG. 30.
Figure 34:
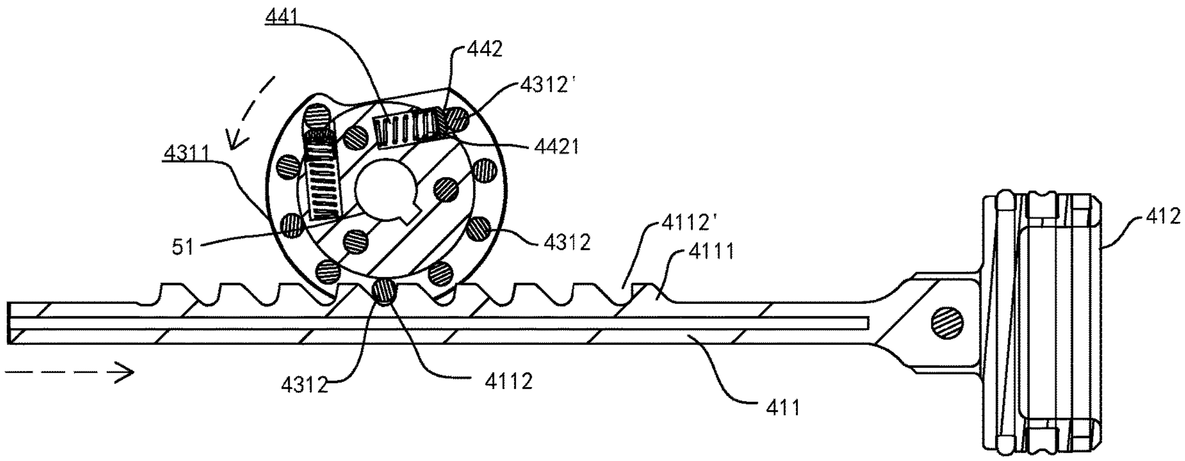
FIG. 34 is another cross-sectional view of the transmission mechanism in association with the striking mechanism according to another embodiment of the invention, where the drive wheel is in accordance with FIG. 30.

As the piston part 412 rises to store energy, it transitions from the state shown in FIG. 24 to that of FIG. 26, until the releasable pinion 50121 contacts the tooth block of the striking member 411, as shown in FIG. 27. As the rotating part 5011 continues to rotate, the striking member 411 disengages from the releasable pinion 50121, the stored energy is released, driving the striking member 411 to descend and shoot out, achieving nailing (the direction of the striking member extension is shown by arrow c in FIG. 29). Furthermore, referring to FIGS. 28 to 31, the releasable pinion 50121 is slidably connected to the rotating part 5011, which has a movable hole 50111 for the releasable pinion 50121 to move therein. Between the releasable pinion 50121 and the rotating part 5011, there disposed a spring member 5013, which includes a spring 50131. One end of the spring 50131 acts on the rotating part 5011, and the other end acts on the releasable pinion 50121. The rotating part 5011 has a spring chamber 50112 for installing the spring member 5013. Specifically, referring to FIG. 30, the outer circumferential side of the rotating part 5011 has an inwardly concave annular groove. The groove has installation holes on both sides for installing the pinions 5012. One side of the groove has a through hole, while the other side has a countersunk hole. The pinions 5012 pass through the through hole and then insert into the countersunk hole, achieving the connection between the pinions 5012 and the rotating part 5011. The movable hole 50111 is divided into two parts: one is an elongated through hole, and the other is an elongated countersunk hole, located on both sides of the groove. The releasable pinion 50121 passes through the elongated through hole and then inserts into the elongated countersunk hole, and it can move within the movable hole. The spring 50131 is installed inside the spring chamber 50112, with one end acts against the interior of the spring chamber 50112 and the other end acts against the releasable pinion 50121. When the pressure from the tooth blocks of the striking member 411 against the releasable pinion 50121 exceeds a certain level, the releasable pinion 50121 can retract, releasing the striking member 411. This instantaneous release of the striking member avoids excessive friction between the striking member and the release position pin, thereby preventing wear of the tooth blocks and wear of the releasable pinion.

Furthermore, the movable hole 50111 is an arc-shaped elongated hole, and the center of this arc-shaped elongated hole is located on the side close to the first pinion. The advantage of this arc-shaped elongated design is that, when the releasable pinion 50121 contacts the tooth block of the striking member 411, the tooth block of the striking member 411 abuts against the end of the movable hole 50111 with the releasable pinion 50121, making the releasable pinion 50121 in a stable force-receiving state (referring to the state in FIG. 28), preventing the striking member 411 from being released prematurely. As the rotating part 5011 continues to rotate, the striking member 411 continues to rise, and the stored energy at the piston part 412 continues to increase, causing greater contact pressure between the tooth block of the striking member 411 and the releasable pinion 50121, until the state in FIG. 29, where the releasable pinion 50121 retracts and compresses spring member 5013, and the striking member 411 is released to nail.

Furthermore, the spring member 5013 also includes a top block 50132, located between the spring 50131 and the releasable pinion 50121. One side of the top block 132 facing the spring 50131 is equipped with a limiting hole for inserting the spring or a limiting column for fitting the spring; another side of the top block 50132 facing the releasable pinion 50121 is equipped with a contact surface 50321 that contacts the releasable pinion 50121. This top block 132 can slide telescopically within the accommodating spring chamber 50112, and after the striking member 411 is released to nail, the elongation of the spring 50131 resets the releasable pinion 50121.

On the rotating part 5011, there is a clearance notch 50113, which is located between the releasable pinion 50121 and the first pinion 50122. The design of this clearance notch 50113 reduces the material used in the rotating part 5011, thus reducing production costs. When the striking member 411 is released to nail, this clearance notch 50113 also provides sufficient space for the striking member 411 to pass through.

Furthermore, the driving wheel 5010 also includes a second spring member 5014. This second spring member 5014 includes a second spring 50141 with one end acting on the rotating part 5011 and the other end acting on the first pinion 50122. There is a second spring chamber 50114 in the rotating part 5011 for installing the second spring member 50141, and there is a second movable hole 50115 on the rotating part 5011 for the first pinion 50122 to move. After the striking member 411 nails, the first pinion 50122 should mesh again with the striking member 411 for the striking member 411 to store energy again. However, at such a time, it cannot guarantee that the striking member 411 is in the predetermined meshing position. Thus, when the striking member 411 is not in the predetermined meshing position, first pinion 50122 would collide and create intense friction with the striking member 411. Therefore, the movable feature of the first pinion 50122 and the design of the second spring member 5014 allow the first pinion 50122 to avoid the collision and intense friction, thus preventing the wear on the striking member 411 and the first pinion 50122 due to this friction. During the rotation of the driving wheel 5010, the second spring member 50141 extends to make the first pinion 50122 fully mesh with the tooth blocks on the striking member 411.

Furthermore, the extension direction of the second movable hole 50115 is parallel to the extension direction of the second spring chamber 50114.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the invention and is not an admission that any such reference is "prior art" to the invention described herein. All references cited and discussed in this specification are incorporated herein by reference in their entireties and to the same extent as if each reference was individually incorporated by reference.

What is claimed is:

1. A nail gun for nailing, comprising:

a magazine mechanism for storing nails;

a driving mechanism;

a striking mechanism in association with the driving mechanism; and a nail passage mechanism, wherein the magazine mechanism and the striking mechanism are both in association with the nail passage mechanism;

wherein the striking mechanism comprises a striking member configured to strike a nail in a striking direction, wherein the striking member comprises:

a striking member body:

a primary guiding groove formed on a first side of the striking member body:

a secondary guiding groove formed on an opposite, second side of the striking member body; and more than one tooth blocks sequentially arranged on a lateral side of the striking member body and protruding from the lateral side of the striking member body, wherein the secondary guiding groove locates the more than one toothed blocks; and wherein the nail passage mechanism comprises:

a muzzle member having a top surface and a nail hole;

a muzzle cover having a bottom surface and disposed above the muzzle member; and a nail passing channel formed between the top surface of the muzzle member and the bottom surface of the muzzle cover permitting the striking member to pass therethrough for striking the nail, wherein the muzzle cover comprises a guiding bar received and accommodated in the primary guiding groove of the striking member; and a clearance groove permitting the more than one tooth blocks of the striking member to pass therethrough, wherein the clearance groove locates on a first side of the nail passing channel; and wherein the muzzle member comprises a protruding blocking rim received and accommodated in the secondary guiding groove of the striking member, wherein the protruding blocking rim locates on the first side of the nail passing channel.

2. The nail gun of claim 1, further comprising an energy storage mechanism in association with the striking mechanism for providing power to the striking member.

3. The nail gun of claim 1, wherein the driving mechanism comprises a transmission component in association with the striking mechanism; and a motor driving rotation of the transmission component.

4. The nail gun of claim 3, wherein the transmission component drives the striking mechanism to move in a direction opposite to the striking direction.

5. The nail gun of claim 4, wherein the transmission component comprises a rotating part driven by the motor for the rotation; a plurality of pinions connected to the rotating part for engaging with the tooth blocks of the striking member; and a limiting disk disposed on the rotating part, wherein the plurality of pinions comprises a movable pinion movably received in a first hole located on the rotating part, and wherein a first spring member is disposed between the movable pinion and the rotating part in the first hole.

6. The nail gun of claim 5, wherein the first spring member comprises a first spring has one end acting on the movable pinion and the other end acting on the rotating part.

7. The nail gun of claim 5, wherein the plurality of pinions further comprises a first pinion movably received in a second hole located on the rotating part, and wherein a second spring member is disposed between the first pinion and the rotating part in the second hole.

8. The nail gun of claim 7, wherein the second spring member comprises a second spring has one end acting on the first pinion and the other end acting on the rotating part.

9. The nail gun of claim 7, wherein the rotating part comprises a clearance notch located between the movable pinion and the first pinion.

10. The nail gun of claim 3, wherein the driving mechanism further comprises a limiting component in association with the transmission component; and wherein the limiting component is configured to stop the rotation of the transmission component.

11. The nail gun of claim 1, wherein the magazine mechanism is connected to the muzzle member and configured to feed the nail into the nail passage mechanism through the nail hole of the muzzle member.

12. The nail gun of claim 1, wherein the muzzle member comprises a magnet installation hole adjacent to the nail hole, wherein the magnet installation hole is configured to receive a magnet.

13. The nail gun of claim 1, wherein the muzzle member and the muzzle cover are connected via a fastener.

* * * * *